(12) United States Patent
Fuhrman et al.

(10) Patent No.: US 12,069,393 B2
(45) Date of Patent: Aug. 20, 2024

(54) MOTION DETECTION BASED ON ANALOG VIDEO STREAM

(71) Applicant: ASPINITY, INC., Pittsburgh, PA (US)

(72) Inventors: Michael Fuhrman, Pittsburgh, PA (US); Brandon David Rumberg, Pittsburgh, PA (US)

(73) Assignee: ASPINITY, INC., Pittsburgh, PA (US)

( * ) Notice: Subject to any disclaimer, the term of this patent is extended or adjusted under 35 U.S.C. 154(b) by 0 days.

(21) Appl. No.: 18/476,677

(22) Filed: Sep. 28, 2023

(65) Prior Publication Data

US 2024/0073352 A1 Feb. 29, 2024

Related U.S. Application Data

(63) Continuation of application No. 18/334,788, filed on Jun. 14, 2023.

(60) Provisional application No. 63/400,824, filed on Aug. 25, 2022.

(51) Int. Cl.
| | |
|---|---|
| *G06T 1/00* | (2006.01) |
| *G06T 7/00* | (2017.01) |
| *G06T 7/136* | (2017.01) |
| *G06T 7/20* | (2017.01) |
| *G06V 20/40* | (2022.01) |
| *H04N 5/14* | (2006.01) |

(52) U.S. Cl.
CPC .............. H04N 5/144 (2013.01); *G06T 1/00* (2013.01); *G06T 7/00* (2013.01); *G06T 7/136* (2017.01); *G06T 7/20* (2013.01); *G06V 20/40* (2022.01)

(58) Field of Classification Search
None
See application file for complete search history.

(56) References Cited

U.S. PATENT DOCUMENTS

| | | | |
|---|---|---|---|
| 2005/0062691 A1 | 3/2005 | Tamura et al. | |
| 2009/0084943 A1* | 4/2009 | Solhusvik | H04N 23/651 |
| | | | 250/214 AL |
| 2012/0097839 A1* | 4/2012 | Jung | H04N 25/75 |
| | | | 341/122 |
| 2012/0169909 A1* | 7/2012 | Rysinski | H04N 25/76 |
| | | | 348/E5.091 |

(Continued)

OTHER PUBLICATIONS

Liu et al., "A low power multi-mode CMOS image sensor with integrated on-chip motion detection," 2013 IEEE International Symposium on Circuits and Systems (ISCAS), Beijing, China, 2013, pp. 2416-2419, doi: 10.1109/ISCAS.2013.6572366.*

(Continued)

*Primary Examiner* — Guillermo M Rivera-Martinez
(74) *Attorney, Agent, or Firm* — Buckley, Maschoff & Talwalkar LLC

(57) ABSTRACT

Motion detection in a video signal stream representing a series of rows in one or more image frames includes filtering the video signal stream for one or more features, generating a plurality of masked video signal streams by multiplying the feature video signal stream with a plurality of mask signal streams, which correspond to an image mask region within one or more image frames, determining a value of an intensity-based parameter of the feature in the plurality of mask signal streams, and determining a change in the value of the intensity-based parameter to detect motion over image frames.

10 Claims, 25 Drawing Sheets

(56) References Cited

U.S. PATENT DOCUMENTS

| | | | |
|---|---|---|---|
| 2013/0187027 A1* | 7/2013 | Qiao | H04N 25/75 250/208.1 |
| 2015/0234443 A1* | 8/2015 | Kulathumani | G06F 1/3206 340/3.1 |
| 2015/0378954 A1* | 12/2015 | Field | G06F 1/266 710/69 |
| 2017/0148133 A1* | 5/2017 | Sumihiro | G06F 13/1684 |
| 2022/0021833 A1* | 1/2022 | Berkovich | H04N 25/443 |

OTHER PUBLICATIONS

Chi et al., "CMOS Camera With In-Pixel Temporal Change Detection and ADC," in IEEE Journal of Solid-State Circuits, vol. 42, No. 10, pp. 2187-2196, Oct. 2007, doi: 10.1109/JSSC.2007.905295.*

Future Technology Devices International Limited (FTDI) et al., "Technical Note TN_158 What is the Camera Parallel Interface?", Ver. 1.0, Issue Date: Mar. 23, 2015, pp. 0-13.*

"PCT Notification of Transmittal of the International Search Report and the Written Opinion of the International Searching Authority, or the Declaration", mailed Sep. 21, 2023 (Sep. 21, 2023), for International Application No. PCT/US2023/072450, 11pgs.

* cited by examiner

MOTION DETECTION BASED ON ANALOG VIDEO STREAM

CROSS-REFERENCE TO RELATED APPLICATIONS

The present application is a continuation of U.S. patent application Ser. No. 18/334,788 entitled "MOTION DETECTION BASED ON ANALOG VIDEO STREAM" and filed on Jun. 14, 2023 which claimed the benefit of U.S. Provisional Patent Application Ser. No. 63/400,824 entitled "MOTION DETECTION BASED ON ANALOG VIDEO STREAM" and filed on Aug. 25, 2022. The entire contents of those applications are incorporated herein by reference.

TECHNICAL FIELD

This disclosure relates to image processing, and in particular to analog based image processing.

BACKGROUND

Image processing is typically carried out in the digital domain. For example, an image sensor may digitize electrical quantities from an array of pixel transducers (e.g., an m×n pixel image frame at 30 frames per second). Once in the digital form, the image processor can carry out various digital domain image processing tasks. Such image processing tasks involve storing the image frames in memory and processing the image frame based on various image processing algorithms. In some instances, these image processing tasks can demand a large amount of memory and processing resources, which can translate into the need for high power consumption. For devices that utilize battery power or other limited energy resources, high power consumption associated with digital image processing tasks can be disadvantageous.

SUMMARY

In some aspects, the techniques described herein relate to a method, including: receiving a video signal stream representing a series of rows in one or more image frames; filtering the video signal stream with an enhancement filter to generate a feature video signal stream, wherein the feature video stream corresponds to a feature in the video signal stream; generating a plurality of masked video signal streams by multiplying the feature video signal stream with a plurality of mask signal streams, wherein each mask signal stream of the plurality of mask signal streams corresponds to an image mask located at a specific location within the one or more image frames; for each mask video signal of the plurality of mask video signals, determining a value of an intensity-based parameter of the feature within the image mask for each image frame of the one or more image frames; determining a change in the value of the intensity-based parameter of the feature over multiple image frames of the one or more image frames determining motion in the video signal streams based on changes in the value of the intensity-based parameter.

In some aspects, the techniques described herein relate to a method, wherein the feature in the video signal stream corresponds to edge information, and wherein the enhancement filter includes a high pass filter.

In some aspects, the techniques described herein relate to a method, wherein the feature in the video signal stream corresponds to a blob, and wherein the enhancement filter includes one of a low pass filter and a band pass filter.

In some aspects, the techniques described herein relate to a method, further including: thresholding the feature video signal stream by preserving the feature video signal stream above a threshold voltage value before generating the plurality of masked video signal streams.

In some aspects, the techniques described herein relate to a method, wherein each mask signal stream of the plurality of mask signal streams includes a first voltage level for portions of rows that correspond to a location of a respective mask region and a second voltage level for a remainder of portions of rows.

In some aspects, the techniques described herein relate to a method, wherein each mask signal stream of the plurality of mask signal streams is maintained at the first voltage for a first duration for each row of the portion of rows corresponding to a width of the respective mask region.

In some aspects, the techniques described herein relate to a method, wherein a number of the plurality of mask signal streams can be dynamically changed over a plurality of the one or more image frames.

In some aspects, the techniques described herein relate to a method, wherein a position of a mask region corresponding to a mask signal stream of the plurality of mask signal streams can be dynamically changed over a plurality of one or more image frames.

In some aspects, the techniques described herein relate to a method, wherein a size of a mask region corresponding to a mask signal stream of the plurality of mask signal streams can be dynamically changed over a plurality of one or more image frames.

In some aspects, the techniques described herein relate to a method, wherein the value of the intensity-based parameter is a location of the intensity-based parameter.

In some aspects, the techniques described herein relate to a method, further including: for each mask video signal of the plurality of mask video signals: generating an integrated masked video signal stream based on an integration operation of the masked video signal stream; generating an x-coordinate signal stream including ramp signals per row duration; generating an x-product signal stream based on multiplication of the masked video signal stream and the x-coordinate signal stream; generating an integrated x-product signal stream based on an integration operation of the x-product signal stream; generating an x-mean stream based on dividing the integrated x-product signal stream by the integrated masked video signal stream; generating a y-coordinate signal stream including a staircase waveform with a step increase in voltage per row duration; generating a y-product signal stream based on multiplication of the masked video signal stream and the y-coordinate signal stream; generating an integrated y-product signal stream based on an integration operation of the y-product signal stream; generating a y-mean stream based on dividing the integrated y-product signal stream by the integrated masked video signal stream; sampling the x-mean stream and the y-mean stream at an end of each image frame of the one or more image frames to determine the location of a center of gravity of the feature within each image frame of the one or more image frames.

In some aspects, the techniques described herein relate to a method, wherein determining the change in the value of the intensity-based parameter of the feature over multiple image frames of the one or more image frames includes determining a change in at least one of sampled x-mean stream values or sampled y-mean stream values over multiple image frames, wherein the change is greater than a threshold value.

In some aspects, the techniques described herein relate to a method, wherein the value of the intensity-based parameter is a value of an integrated intensity of the intensity-based parameter.

In some aspects, the techniques described herein relate to a method, further including: for each mask video signal of the plurality of mask video signals: generating an integrated masked video signal stream based on an integration operation of the mask video signal; sampling the integrated masked video signal stream at an end of each image frame of the one or more image frames to determine a value of the integrated mask video stream.

In some aspects, the techniques described herein relate to a method, wherein determining the change in the value of the intensity-based parameter of the feature over multiple image frames of the one or more image frames includes determining a change in the value of the integrated mask video stream greater than a threshold value over multiple image frames.

In some aspects, the techniques described herein relate to a method, further including: disabling an image sensor from digitizing pixel information or outputting digital image frame data until receiving an indication of determination of motion in the video signal streams.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
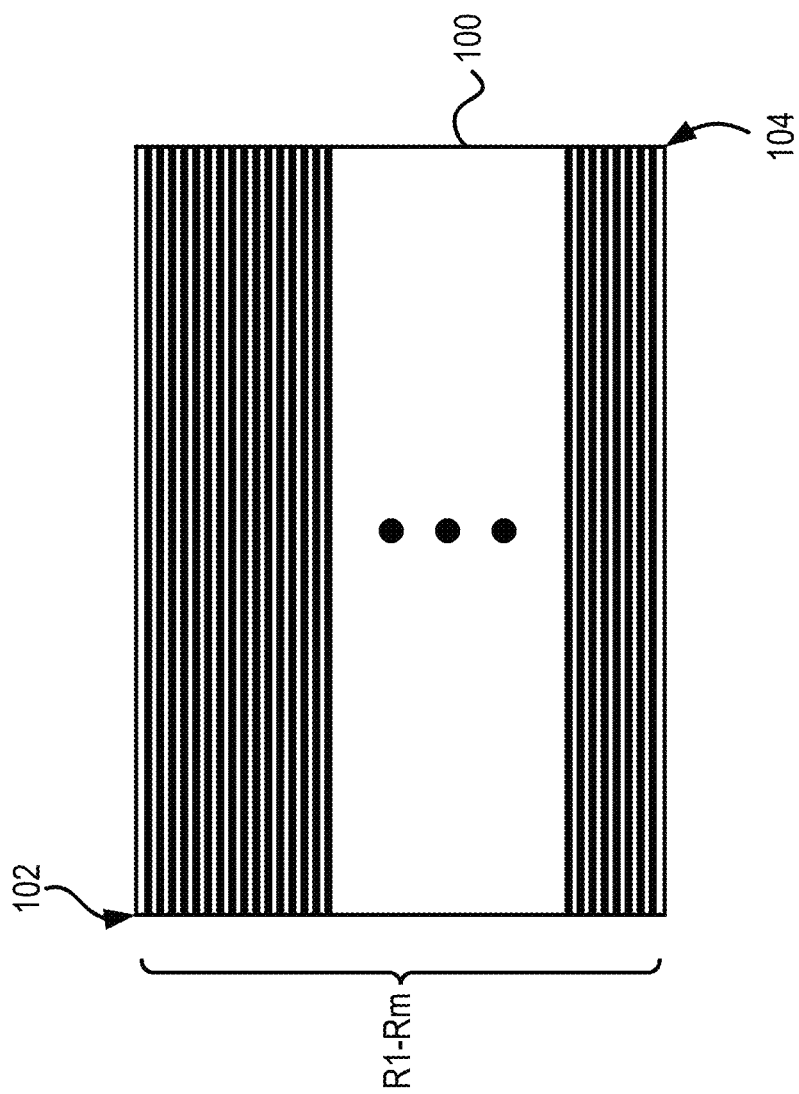
FIG. 1 shows an example image frame and video signal stream associated with an output of a camera.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

Like reference numbers and designations in the various drawings indicate like elements.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of" Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil," or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e., one atmosphere).

Conventional image processing in the digital domain can demand high memory and processing resources, which can translate into a need for high energy resources. In a typical image processing scenario, an image sensor such as, for example, a camera, can generate a video including a series of image frames. In instances where the camera output is a digital output, each image frame can be composed of m×n pixels, where m and n refer to the dimensions of the image frame—resulting in a two-dimensional representation of the image frame. Each pixel can be represented by one or more magnitudes of intensities corresponding to one or more colors such as, for example, red, green, blue, etc. The magnitudes of intensities can be represented digitally by a k-bit value. For example, the magnitude of intensity for each pixel can be represented by an 8-bit value. In instances where the camera output is an analog output, the image frames can be represented by a voltage signal that corresponds to the intensity levels at a series of r rows in a frame. For processing in the digital domain, the analog voltage signal can be converted into a digital representation of the two-dimensional frame as discussed above. At a processor, the image processing tasks carried out on the digital domain representation of the image frames can include image preprocessing, image enhancement, image transformation, image classification and analysis, etc. Many of the image processing tasks act on a portion or an entirety of the two-dimensional image frame. As an example, a convolution operation is commonly employed for many of the image processing tasks mentioned above, where the convolution operation involves two-dimensional matrix operations on the two-dimensional image frames. The amount of memory and the processing resources needed to process the two-dimensional image frames can increase considerably with the size of the images, and the need for large memories and processors can have a negative impact on the power consumption of the devices that operate on stored energy sources such as batteries.

The need for large amount of computing resources for image processing tasks can force image processing tasks away from edge devices. For example, edge devices such as cameras are commonly powered by batteries. Due to limited energy resources at the camera, the image processing tasks are commonly offloaded to a remote processing unit. However, the camera needs to still remain ON and transmit images to the remote processing unit, causing battery drain.

Some cameras can be configured to switch ON only when motion is detected. The camera's operation can include a standby mode, in which the camera assumes a low power state when no motion is detected. Motion detection can be carried out by an external motion detector (e.g., an infra-red motion detector), which can transmit a "wake-up" message to the camera upon detecting motion. The camera, when in standby, can switch to full power mode upon receiving the wake-up message. However, motion detection using an external motion detector can be inaccurate and can suffer from high rates of false positives as well as false negatives. For example, IR detectors can often mistakenly indicate motion detection even during brightness changes, which can occur, for example, due to lights been turned on without anything actually moving in front of the camera. This can cause the camera to undesirably stay in the standby state even if there is actual motion detected by the motion detector or to undesirably wake up and consume power even if there is no actual motion.

Some systems operate the camera at low resolution to reduce the amount of computing resources needed until motion is detected. That is, the camera is operated to generate image frames at a resolution that is lower than that of the full resolution capability of the camera. The low-resolution image frames can be processed, albeit with relatively lower computing resources than those needed to process full resolution image frames, to detect motion. Once motion is detected, the camera can be switched to high resolution mode. However, even at low resolution, image processing of the two-dimensional image frames can consume enough power to have a negative impact on the camera's battery life. Other systems can operate the camera at lower frame rates to reduce the amount of computing resources needed until motion is detected. For example, the camera may operate at 15 frames per second to save power as opposed to operating normally at 30 frames per second. Because the frame rate is reduced, the power consumed per unit time is also reduced. Once the motion is detected, the camera can switch to the higher frame rate. Nevertheless, even at the lower frame rate, the processing of the two-dimensional image frames can drain the camera's battery.

As discussed herein, systems and methods are presented that allow image processing at power consumption levels that are substantially lower than those when two-dimensional image processing is carried out in the digital domain. In particular, the processing of the video captured by the camera is carried out on a one-dimensional video signal. The camera outputs a video signal stream that represents a series of rows in one or more image frames. In some implementations, the video signal stream can be an analog video signal stream. In some other implementations, the video signal stream can be a digital video signal stream. Image processing of the video signal stream can be carried out in the one-dimensional space, without having to convert the video signal stream into a conventional image frame with m×n pixels.

In some examples, the image processing on the one-dimensional video signal stream can be used to detect motion of objects within the image frame. The video signal stream can be processed to extract feature video signal streams, where features can include, for example, edges, blobs or light intensity within the image frame. These features, however, are determined from the one-dimensional video signal stream. In particular, the video signal stream is processed to generate one or more feature video signal streams, where each feature video signal stream corresponds to a feature of interest. An intensity-based parameter associated with each feature video signal stream can be determined to aid in detecting motion.

A center-of-gravity of the feature can be one example of the intensity-based parameter associated with the feature. Geometric median or medoid can also be used in addition to or instead of center-of-gravity. A value of the center-of-gravity can be a location of the center-of-gravity of the feature. The location of the center of gravity of the feature can be expressed in estimated x and y coordinates for each feature video signal stream. The x and y coordinates can be represented in the form of voltage or current. In some examples, changes in the x and y coordinates can be detected in the analog domain based on which an interrupt can be provided as a wake-up trigger to a processor or the camera. These changes can occur at the frame rate of the camera, which frame rate is at a relatively lower frequency compared with the frequency of the clock signal of the camera. In some examples, the x and y coordinates can be sampled repeatedly (e.g., every frame) by the processor, which can convert the sampled voltage or current into a digital value. The processor can then track the sampled values for changes in the x and y coordinates of the features over multiple image frames, indicating whether the features have changed position over the multiple image frames. This approach provides for low power consumption by the processor since the signal amplitudes change at the low frequency of the camera frame rate. Another example of a feature is the average intensity of the image which can increase or decrease when objects move within the field of view. Yet another example of a feature is the average intensity within each mask.

Once the processor detects that features within the feature video signal streams have changed position or intensity, the processor can switch to two-dimensional digital signal processing of the video signal output by the camera. Thus, until motion is detected, the video signal stream is processed in the low power one-dimensional domain. After motion is detected, the image processing switches to conventional two-dimensional digital processing.

FIG. 1 shows an example image frame and video signal stream associated with an output of a camera. In particular, FIG. 1 shows an image frame 100 that can be representative of an image frame output by a video camera. For simplicity, the content of the image frame is not shown. The figure shows the image frame 100 including m rows R1-Rm. The image frame 100 can be represented by a one-dimensional video signal stream composed of video signals corresponding to the series of rows R1-Rm. For instance, the video signal stream representing the image frame 100 can begin from a first corner 102 (the top left corner, for example) and end at the opposite second corner 104 (the bottom right corner, for example), and include video signals corresponding to each of the rows R1-Rm. While FIG. 1 shows the first corner 102 and the opposite second corner 104 as being the top left corner and the bottom right corner of the image frame 100, in some implementations, the first corner 102 can be any one of the four corners of the image frame 100 with the opposite second corner 104 being the corner diagonally opposite to the first corner 102. In one example, the video signal stream can represent the rows from left to right. For example, the video signal stream can begin with the signal associated with row R1 from the left of the frame to the right of the frame, followed by the signal associated with row R2 again from the left of the frame to the right of the frame, and so on, until the last row Rm of the image frame 100. In some instances, the video signal stream can be similar to a decoded National Television System Committee (NTSC), Phase Alternating Line (PAL), or SECAM video signal, or any other analog video signal that captures the image frames of a video as rows or scan lines. Many cameras output analog video signals in the NTSC/PAL/SECAM format at one of their output ports. In some instances, the video signal stream can be generated from a digital image frame, where the image frame is converted row by row into an analog video signal stream.

Figure 2A:
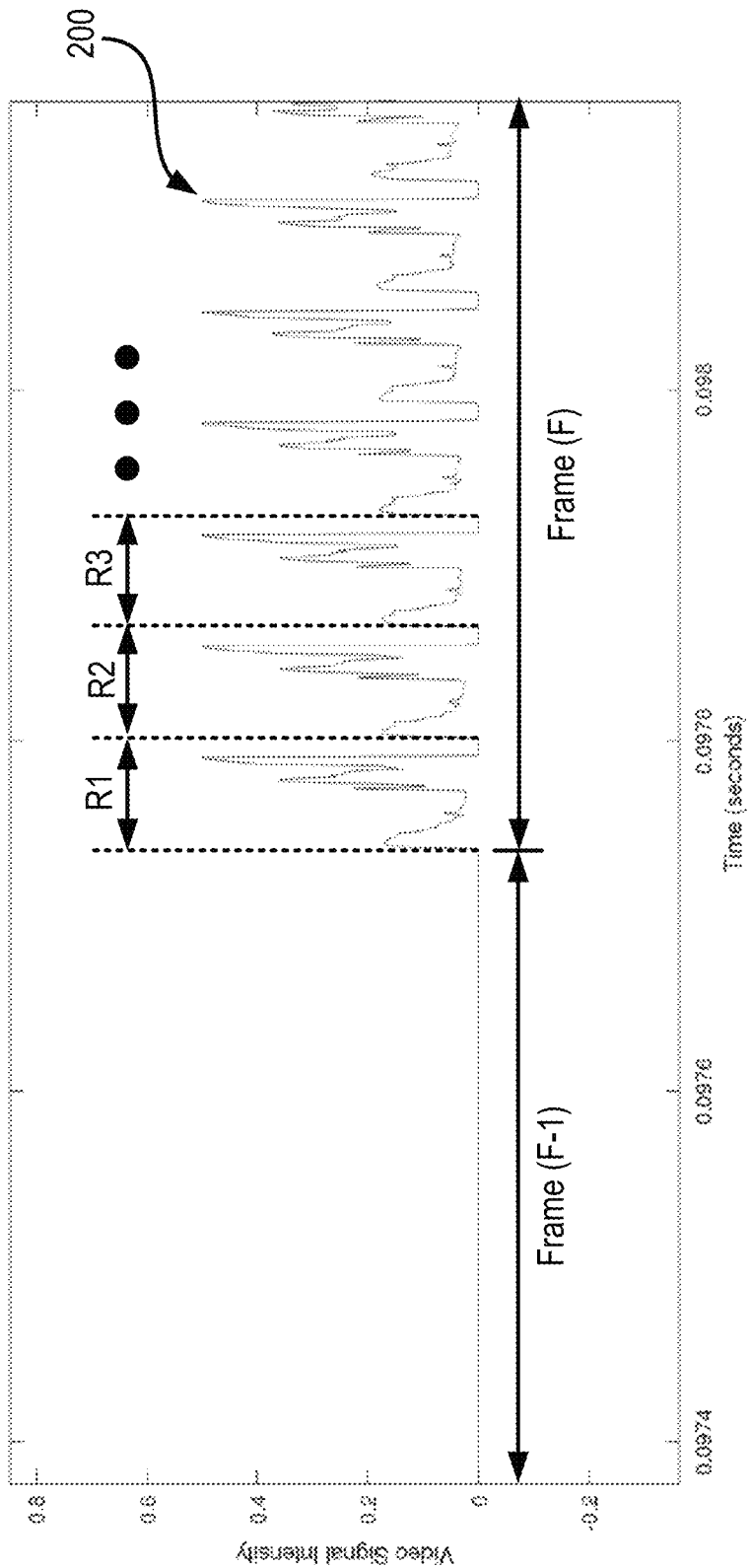
FIG. 2A shows an example video signal stream showing the video signal intensity.

FIG. 2A shows an example video signal stream 200. The video signal stream 200 is shown over an x-axis representing time and the y-axis representing video signal intensity, which can be a voltage value, for example. In instances where the video signal stream 200 is an analog signal, the video signal stream 200 can be continuous in time as well as in magnitude. In instances where the video signal stream 200 is a digital signal, the video signal stream 200 can be discrete in time as well as in magnitude. The video signal stream 200 shown in FIG. 2A is only a portion of the video signal stream that can be generated by a video camera that captures multiple image frames. The video signal stream 200 shown in FIG. 2A, for the sake of clarity, shows a portion between an image frame (F-1) and image frame F. Referring to image frame F, the video signal stream 200 includes segments associated with each of the rows, which segments associated with the rows R1, R2, and R3 have been explicitly shown. While not shown in FIG. 2A, the video signal stream 200 can include timing signals indicating the start and end of an image frame. As mentioned above, the video signal stream 200 can be representative of a NTSC/PAL/SECAM formatted video signal or a row-by-row representation of the image frame. In some instances, the video signal intensity can correspond to a single color representation (e.g., red, green, blue, etc.). In some instances, the video signal intensity can correspond to a grayscale video signal intensity.

Each row segment (e.g., row R1) of the video signal stream 200 represents the video signal intensity of the image frame 100 along a length of the row R1. It should be noted that in the digital representation of an image with m rows and n columns, each row of the image frame can include video signal intensities of n pixels within that row. However, in the analog one-dimensional representation of the image frame, the row segment of the video signal stream 200 is a continuous signal and does not necessarily represent a specific number of pixels within that row. Nevertheless, the video signal intensities across the row segment correspond spatially to the video information in the image frame where the row is located. For example, referring to FIG. 1, the video information across the width (from left to the right) of the image frame at the location of the topmost row can be represented by the video signal intensities (from left to right) across the R1 segment of the video signal stream 200. Similarly, the video information across the width (from left to right) of the image frame 100 at the location of the second row from top can be represented by the video signal intensities (from left to right) across the R2 segment of the video signal stream 200. In this manner, the video information, row-by-row, of the image frame 100 is represented by the row segments of the video signal stream 200. One way of viewing the video signal stream 200 is that the video signal stream 200 is representative of the video information of each row in the image frame 100 stitched together end-to-end.

Figure 2B:
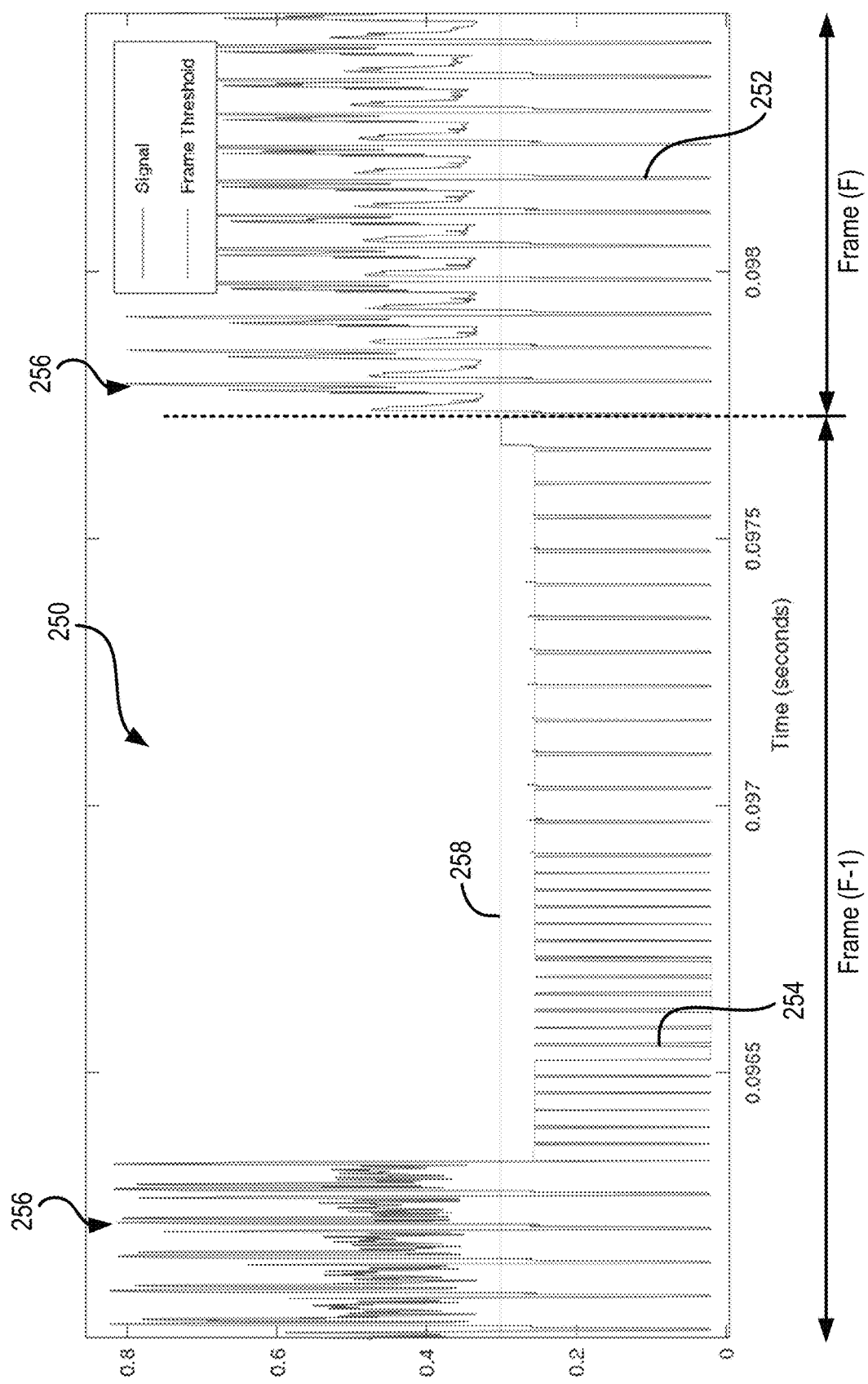
FIG. 2B shows an example video signal stream that includes timing information.

The video signal stream can include video components in addition to the video intensity information. For example, the video signal can include signals corresponding to intervals between frames (vertical blanking) and intervals between rows (horizontal blanking). For example, FIG. 2B shows an example video signal stream 250 that includes timing signals. In particular, FIG. 2B can be converted into the video signal stream 200 shown in FIG. 2A. FIG. 2B shows the video signal stream 250 includes an image frame F-1 and a subsequent image frame F. Each image frame includes a video signal that represents horizontal sync signals 252, vertical sync signals 254, and video signal intensity 256. The horizontal sync signals 252 can indicate the end of a row, while the vertical sync signals 254 can indicate the end of an image frame. In some instance, the video signal stream 250 can be processed to remove the horizontal sync signals 252 and the vertical sync signals 254 (such as, for example, the video signal stream 200 shown in FIG. 2A). For example, a threshold value 258 can be set such that only those portions of the video signal stream 250 that is greater than or equal to the threshold value 258 is retained, while the portions of the video signal stream 250 that are below the threshold value 258 are instead made equal to a constant voltage value, e.g., zero volts. In one example, circuitry can be used to process the video signal stream 250. In one example, the circuit can include a comparator, where the video signal stream 250 is compared with the threshold value 258. The output of the comparator (assuming that the comparator outputs a positive voltage (e.g., 1 V) when the video signal stream 250 is greater than or equal to the threshold value 258 and outputs zero volts when the video signal stream 250 is less than the threshold value 258) can be provided to one input of an analog multiplier, the other input of which receives the video signal stream 250. Thus, when the video signal stream 250 is greater than the threshold value 258, the multiplier outputs a multiplication of the positive voltage (e.g., 1V) with the video signal stream 250, while when the video signal stream 250 is less than the threshold value 258, the multiplier outputs zero volts. In this manner, the video signal intensity is retained, while the vertical sync signals 254 and the horizontal sync signals 252 the voltages of which are below the selected threshold value 258 are removed. It should be noted that the above described circuit is only an example, and that a person skilled in the art can utilize other circuitry to carry out the removal of the horizontal sync signals 252 and the vertical sync signals 254.

Figure 3A:
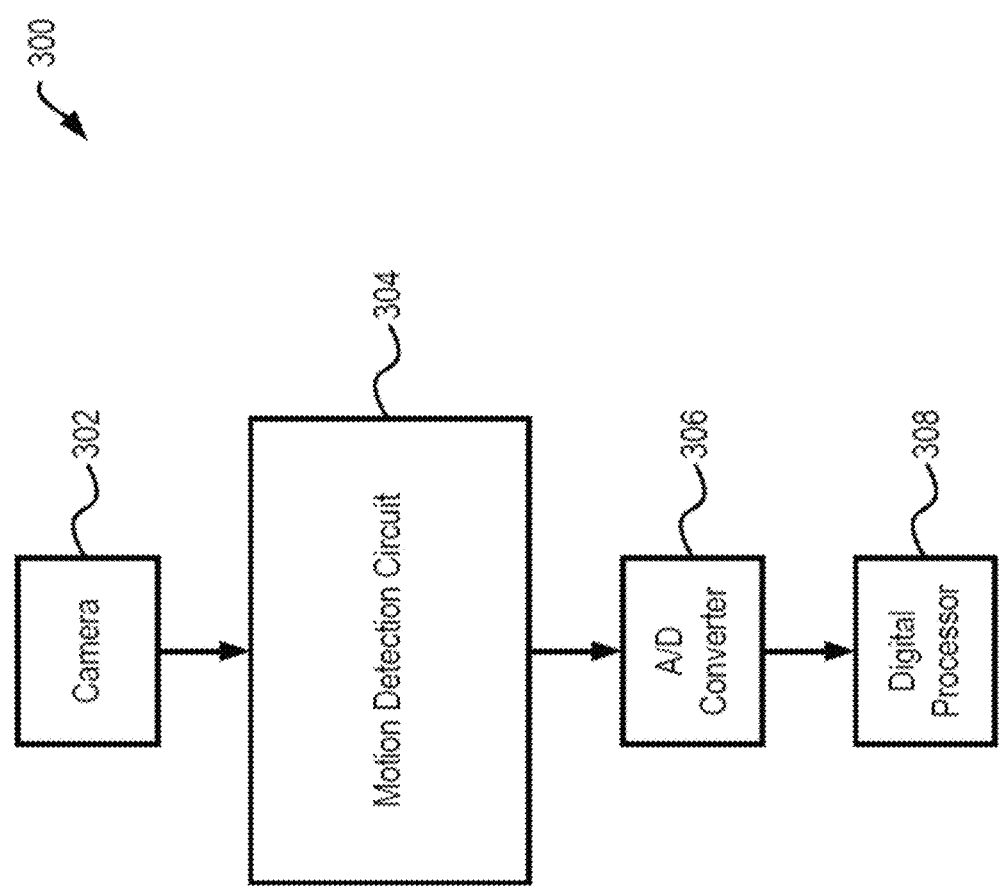
FIG. 3A shows an example motion detection system for a one-dimensional video signal stream.

The video signal stream 200 can be processed in the analog domain to detect motion of features within the image frame 100. FIG. 3A shows an example motion detection system 300 for a one-dimensional video signal stream. In particular, the motion detection system 300 includes a camera 302, a motion detection circuit 304, an analog-to-digital converter 306, and a digital processor 308. The camera 302 can generate an analog video signal stream similar to that discussed above in relation to FIGS. 1-2B. The camera 302 can also output a digital video signal stream, which can be similar to that shown in FIG. 2A, but discrete in time and in magnitude. In some instances, the camera 302 can output image information in the Digital Visual Interface (DVI) standard, the High Definition Multimedia Interface (HDMI), a digital video port (DVP), a mobile industry processor interface (MIPI), or any other digital video standard. In some instances, the video signal may be encoded in one or more video encoding standards. The camera 302, or an external conversion circuit, can convert the output signal of the camera into the desired digital or analog video signal stream 200. Converters such as HDMI to VGA or DVI to VGA, DVP to VGA, MIPI to VGA, etc., can be used, and are well known in the art. In some examples, the camera 302 may output additional signals such as a Horizontal Sync, a Vertical Sync, and a Master Clock.

The motion detection circuit 304 receives and processes the video signal stream received from the camera 302 to detect motion. It should be noted that during analog processing of the video signal stream 200, the motion detection circuit 304 carries out the processing in real-time and does not digitize the video signal stream 200 into a two-dimensional video frame to detect motion. As discussed further below, the motion detection circuit 304 identifies features such as, for example, edges, blobs or image intensity in the video signal stream 200 and determines values of intensity-based parameters such as, for example, an integrated intensity level, or a center of gravity, of the identified features within various portions of the image frame. For integrated intensity, the value can represent the integrated value (e.g., voltage or current) of the intensity of the feature, and for center of gravity the value can represent the location of the center of gravity. While in two-dimensional image frames it is relatively easy to partition the image frame into various portions and to determine the value of the intensity-based parameter, the motion detection circuit 304 instead determines the value using a one-dimensional video signal stream 200. In one approach, the motion detection circuit 304 determines a value of the center of gravity in the form of X and Y coordinates. In particular, the motion detection circuit 304 can output an X coordinate and a Y coordinate of each location. The locations of the center of gravity are provided in the form of an electrical parameter for example, voltage or current. For example, the motion detection circuit 304 can output a voltage level for the X coordinate and a voltage level for the Y coordinate of each location.

The analog-to-digital converter 306 samples the values of the intensity-based parameters provided by the motion detection circuit 304 at the end of a frame before the beginning of the next frame. For example, the analog-to-digital converter 306, at the end of each image frame, can sample the voltage associated with the X coordinate and the voltage associated with the Y coordinate output by the motion detection circuit 304 for each location, followed by digitizing the samples. The analog-to-digital converter 306 can provide the digitized coordinates to the digital processor 308. The digital processor 308 can save the digital values of the coordinates and track any changes in the coordinate values frame-over-frame. If the values or statistics based on the values change over a predetermined threshold or a threshold determined from recently sampled data during a short time window, the digital processor 308 can indicate that motion has been detected. In some examples, the values of the intensity-based parameters can be processed in the analog domain to determine motion, instead of being processed in the digital domain by the digital processor 308. In some such examples, the analog-to-digital converter 306 and the digital processor 308 may not be needed. The analog processors can process the values of the intensity-based parameters to determine whether there is motion detected.

One benefit of detecting motion in the manner discussed above is the low power consumption and the real-time determination of motion. In some instances, the detection of motion can serve as a wake-up trigger to the camera 302, which can be configured to change the mode of operation to a high-power mode of operation. Until the motion is detected, the camera 302 can be configured to operate in a low power mode, where the camera 302 is configured to output the video signal stream 200 but is otherwise configured to operate with limited features. In some instances, detection of motion can be used as a wake-up signal for a larger device coupled with the motion detection circuit 304.

Figure 3B:
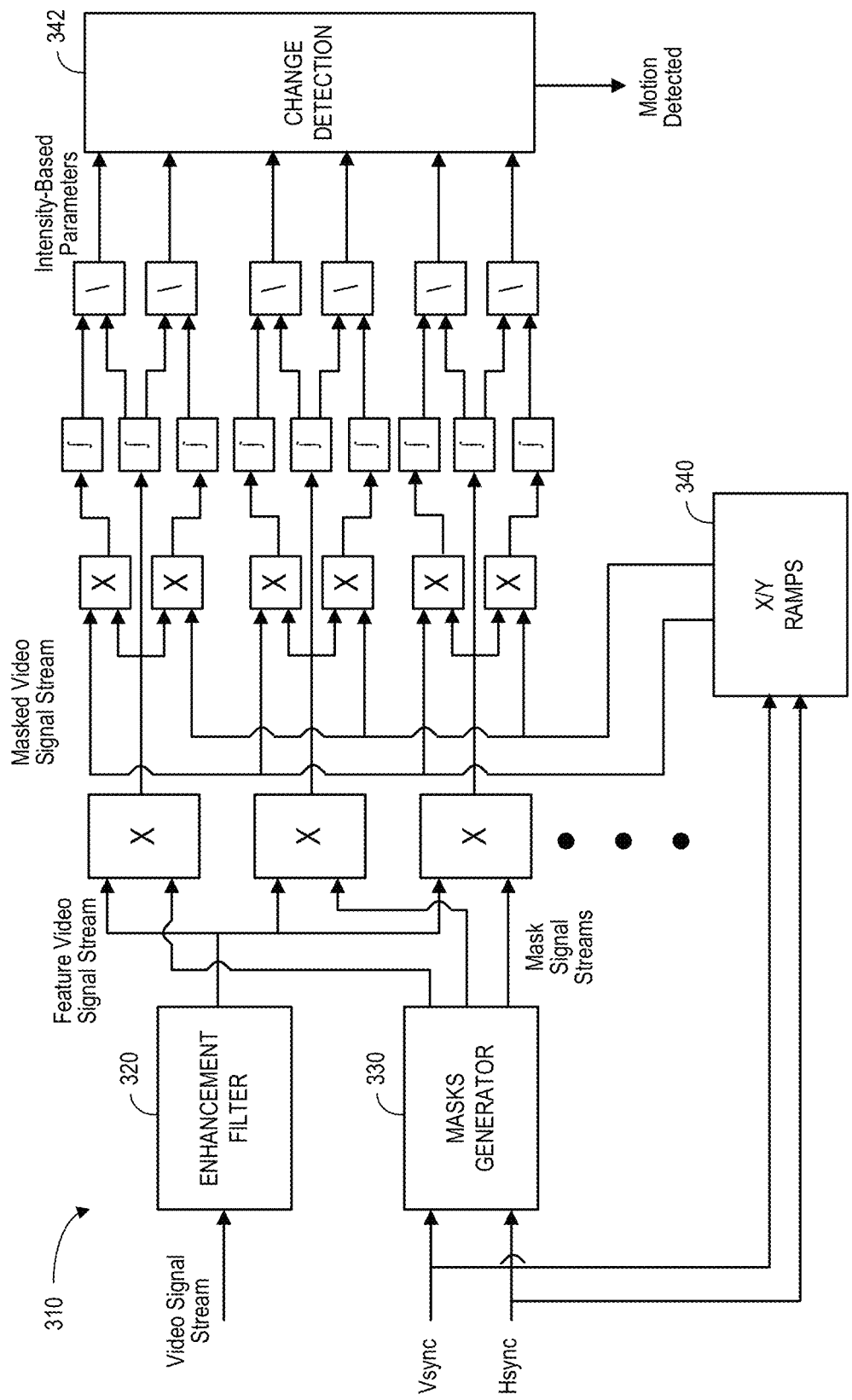
FIG. 3B is an overall signal chain of a motion detection system according to some embodiments.

FIG. 3B is an overall signal chain 310 of a motion detection system according to some embodiments. The signal chain 310 includes an enhancement filter 320 that receives a video signal stream and generates a feature video signal stream. A masks generator 330 receives Vsync and Hsync signals and generates mask signal streams. Note that X/Y ramps 340 may also receive the Vsync and Hsync signals. Information from the enhancement filter 320, masks generator 330, and X/Y ramps 340 may then be processed via multiply elements, integrate elements, and/or divide elements to create a masked video signal stream and intensity-based parameters suitable for change detection 342 according to some embodiments. The change detection 342 may then indicate when motion is detected (e.g., by outputting a final assertion that motion was detected in connection with a wakeup signal). Note that the enhancement filter 320 may be optional (e.g., the video signal stream can go directly into the masking operations and provide similar information as Low Pass Filter (LPF) blob emphasis.

Figure 3C:
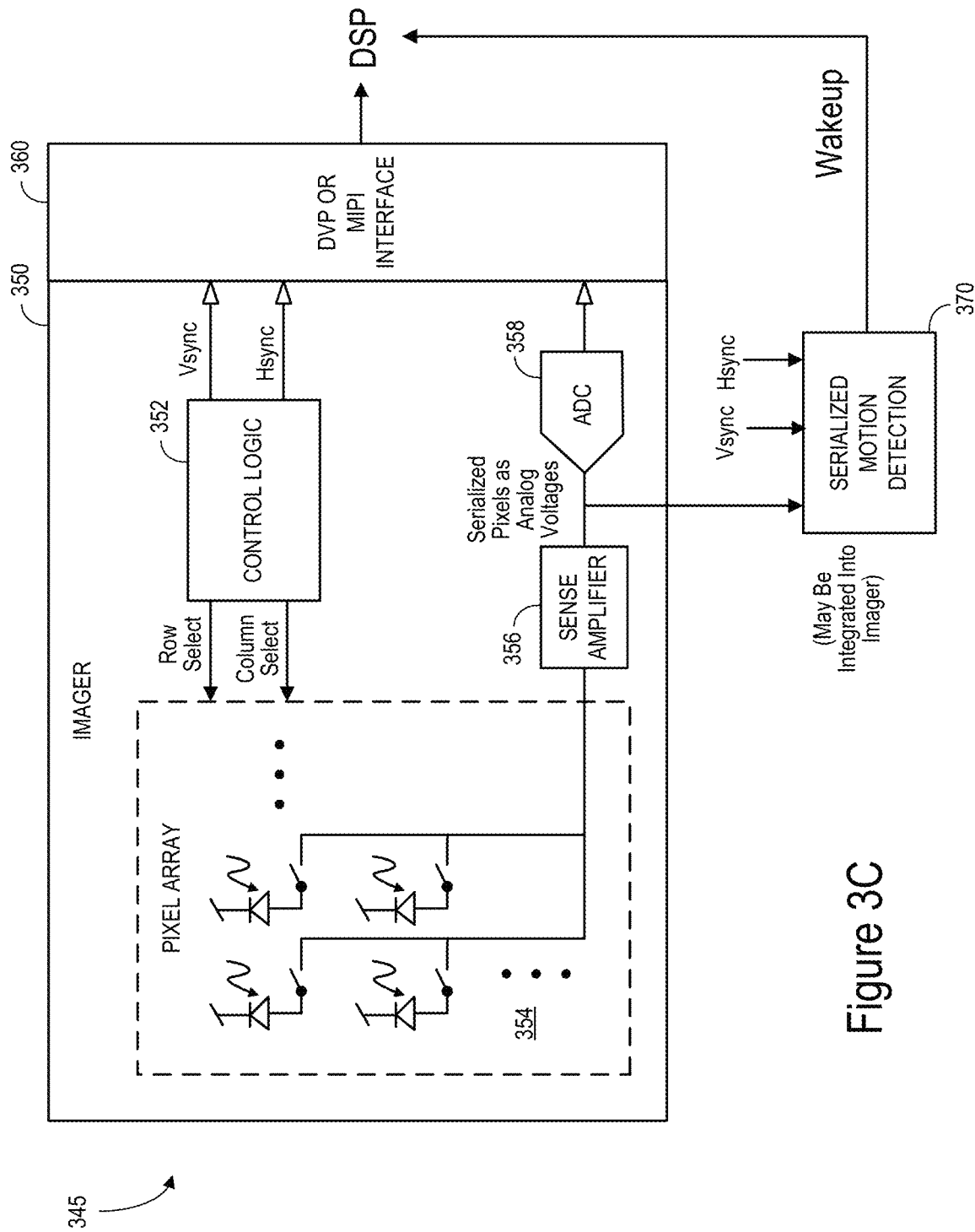
FIG. 3C is a system architecture of a video signal stream in accordance with some embodiments.

Some embodiments described herein discuss legacy analog TV transmission protocols and formats as examples. Suh formats, however, may not be practical for a battery-powered sensor. The goal, according to some embodiments, is to interface with analog pixel values before they are ever digitized. For example, FIG. 3C is a system architecture 345 of a video signal stream in accordance with some embodiments. An imager 350 contains control logic 352 and a pixel array 354. An electrical quantity (e.g., a photo-induced current) is sensed by an amplifier and ordinarily digitized for the output interface. According to some embodiments, serialized motion detection 370 (which may be external or integrated into the imager 350) operates directly on serialized pixels as analog voltages from a sense amplifier 356 so that an Analog-to-Digital Converter (ADC) 358 and a general output interface 360 is disabled until needed (as indicated by a "wakeup" signal). Embodiments may also make use of horizontal and vertical sync signals to interpret the timing of the analog voltages.

Figure 3D:
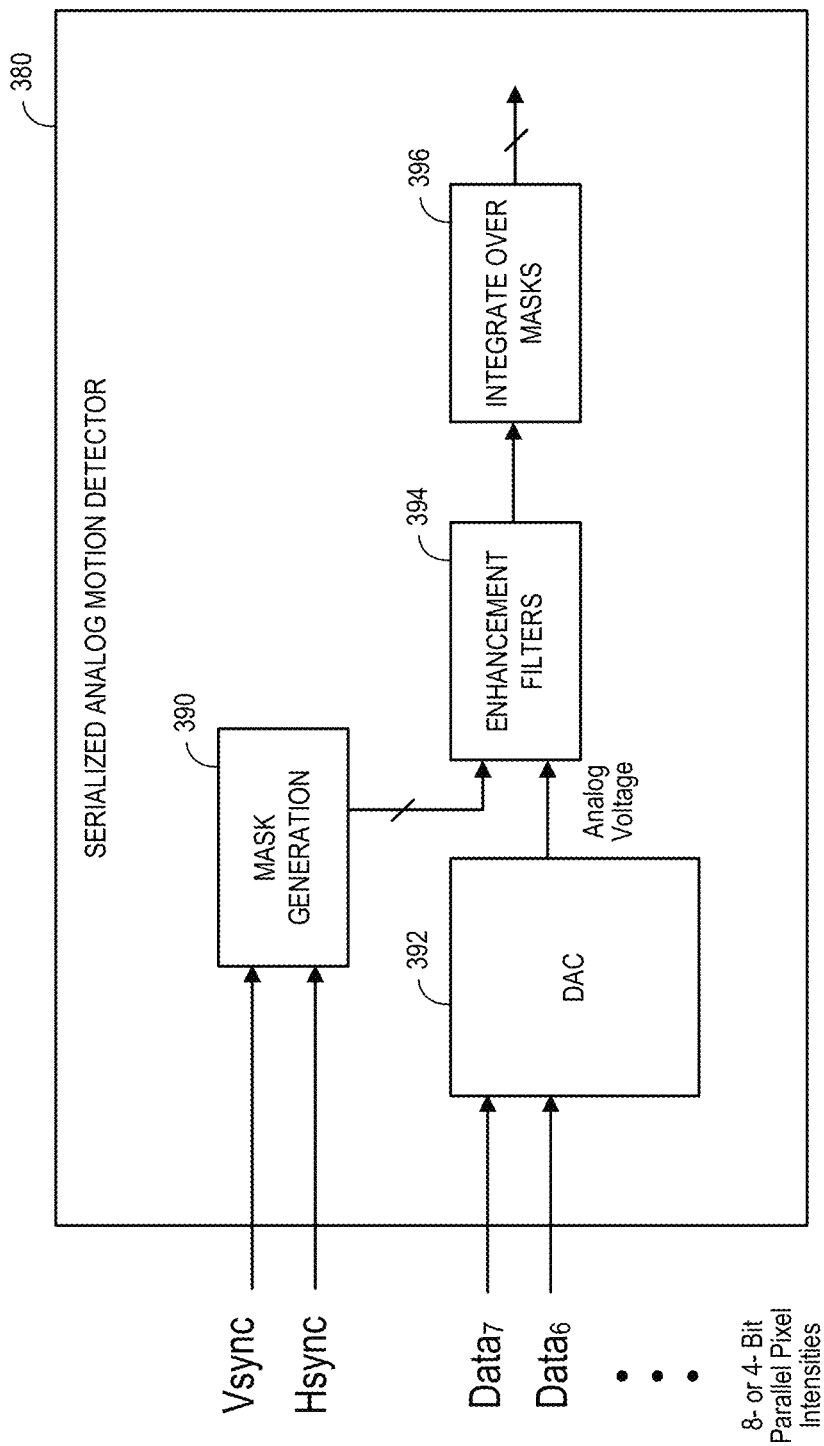
FIG. 3D is a serialized analog motion detector for a common digitized image stream according to some embodiments.

A motion detector may also operate on a digital DVP format by including a low-resolution DAC to convert the parallel-interface pixel values to an analog stream. For example, FIG. 3D is a serialized analog motion detector 380 for a common digitized image stream according to some embodiments. The motion detector 380 (which may also detect motion from DVP signal) receives Vsync and Hsync along with parallel pixel intensity data. Mask generation 390 and a DAC 392 are provided to enhancement filters 394 which, after integrating over masks 396, may result in motion detection information.

Figure 4:
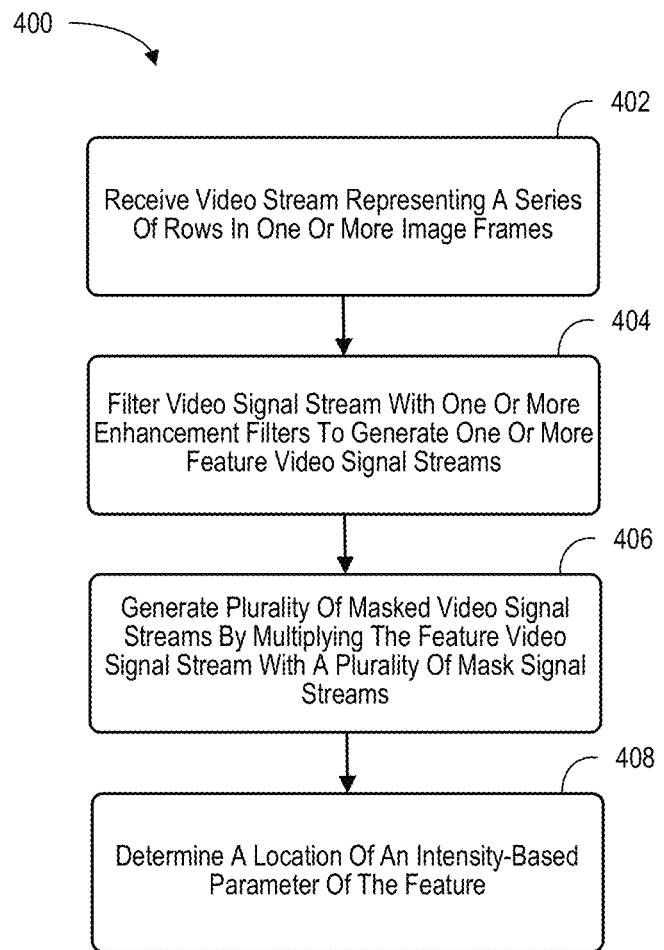
FIG. 4 shows a flow diagram of an example motion detection process.

FIG. 4 shows a flow diagram of an example motion detection process 400. The motion detection process 400 includes receiving a video stream representing a series of rows in one or more image frames (402). At least one example of this process step has been discussed above. For example, referring to FIG. 3A, the motion detection circuit 304 receives the video signal stream 200 output by the camera 302. The video signal stream 200 represents a series of rows R1-Rm (see FIG. 1 and FIG. 2A) of one or more image frames F-1 and F. The video signal stream 200 can be an analog signal continuous in time and in magnitude. In some examples, the average brightness of a specific region or the center of gravity of the intensity within a specified area can be determined to detect motion. In addition, the motion detection process 400 includes filtering the video signal stream with one or more enhancement filters to generate one or more feature video signal streams (404). The enhancement filters can include one or more filters such as, for example, a series of low-pass, high-pass, or band-pass filters followed by thresholding. The enhancement filters can be used to extract particular features within the video signal stream. These features can include, for example, edges and blobs. Other features can include corners, ridges, the total image intensity, the total image intensity within each masked area, and any other features associated with image objects for which motion tracking is desired.

Figure 5:
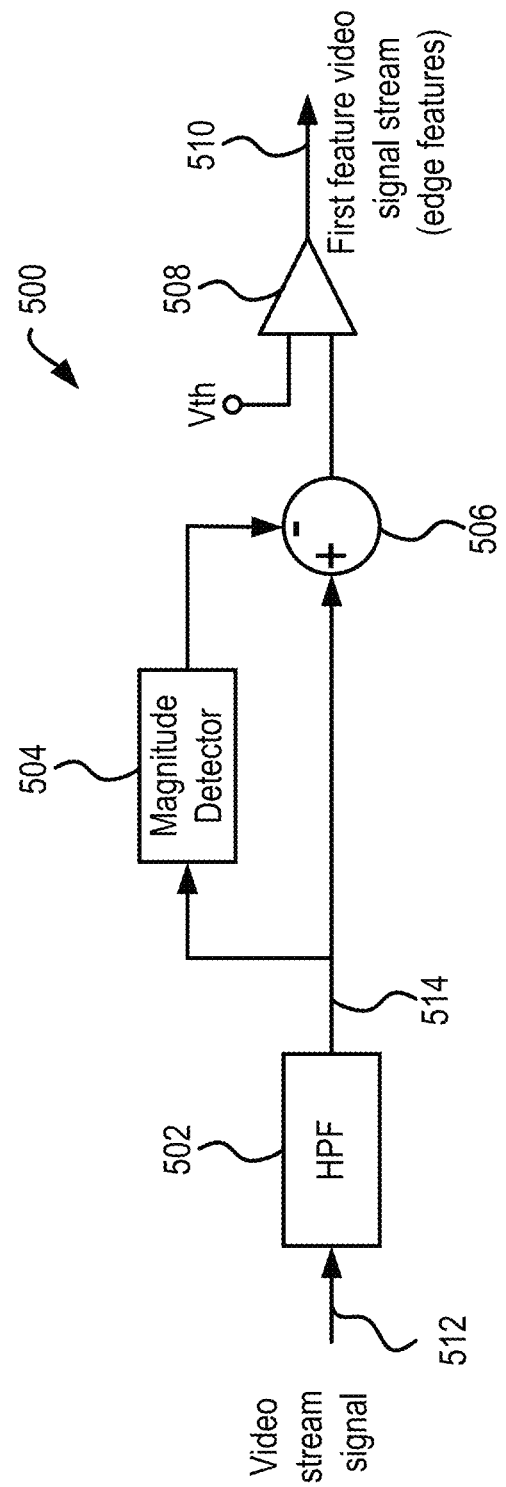
FIG. 5 shows an example first feature extraction circuit for generating a feature video signal.

FIG. 5 shows an example first feature extraction circuit 500 for generating a feature video signal. The first feature extraction circuit 500 can be utilized to generate a first feature video signal corresponding to edge features. The first feature extraction circuit 500 can include a high-pass filter 502, the output of which is coupled with a magnitude detector 504 and a positive terminal of a summer 506. The output of the magnitude detector 504 is coupled with a negative terminal of the summer 506. The output of the summer 506 is coupled with one input of a comparator 508, the other input of which can be coupled with a voltage source. The output of the comparator 508 provides the feature video signal stream 510. Edge features are typically represented by high frequency signals. Therefore, one approach to preserve edge features within a signal is to filter the signal with a high-pass filter that preserves the high frequency components of the signal but attenuates low frequency components of the signal. The high-pass filter 502 can be an active high-pass filter (e.g., including active devices such as transistors and/or operational amplifiers) or a passive high-pass filter (e.g., including only passive devices such as resistors, capacitors, or inductors). The cut-off frequency of the high-pass filter 502 can be selected based on the Nyquist frequency of the video signal stream 200. As an example, the cut-off frequency of the high-pass filter 502 can be 90% to 95% of the Nyquist frequency. In some examples, the high-pass filter 502 can be preceded by or followed by a low-pass filter to attenuate high frequency noise, which may corrupt the first feature video signal stream 510. The cut-off frequency of the low-pass filter can be greater than the cut-off frequency of the high-pass filter 502.

A video signal stream 512 can be provided to the input of the high-pass filter 502. The video signal stream 512 can be similar to the video signal stream 200 output by the camera 302. In some instances, the video signal stream 512 can be a filtered version of the video signal stream 200. As an example, the video signal stream 200 can include signal components related to timing information, which allows a device receiving the video signal stream 200 to synchronize its clock or internal circuitry with the video signal stream 200. However, the timing information, while helpful in synchronization, does not include any intensity-based information. Therefore, in one approach, the video signal stream 200 can be processed to remove the timing information prior to feature extraction and presented to the first feature extraction circuit 500 as the video signal stream 512. In some examples, the sync pulses can be removed by applying a threshold at a level between the sync pulse level and the intensity level and then applying an offset to the intensity. Alternatively, an offset can be applied to the video signal and then a threshold can be applied.

Figure 6:
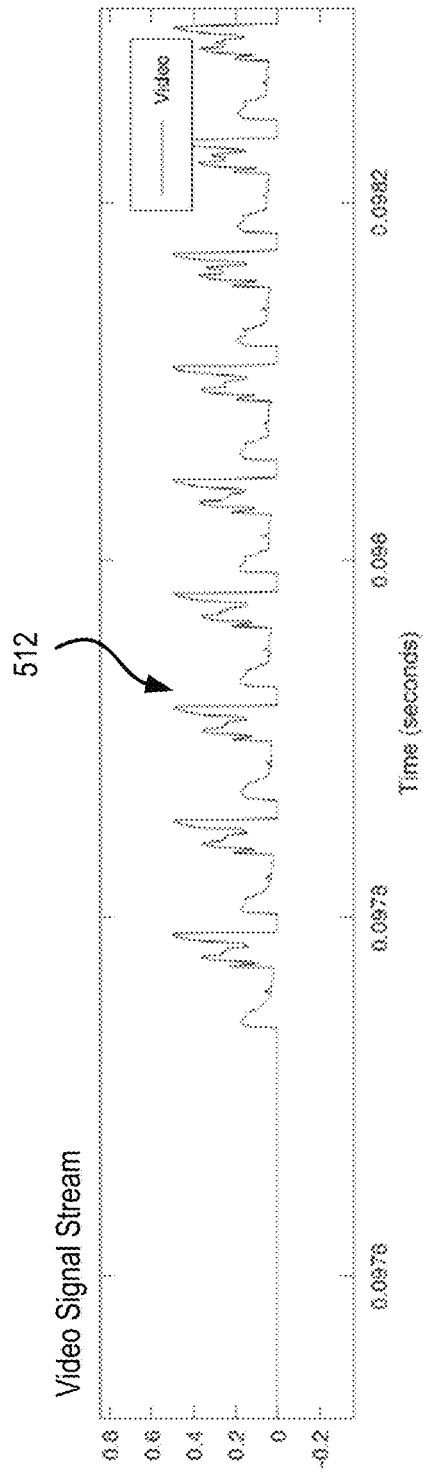
FIG. 6 shows an example video signal stream provided as an input to the first feature extraction circuit shown in FIG. 5.

FIG. 6 shows an example video signal stream 512 provided as an input to the first feature extraction circuit 500 shown in FIG. 5. The video signal stream 512 has been stripped of the timing information included in the video signal stream 200 output by the camera 302.

As mentioned above, the high-pass filter 502 preserves high frequency components of the signal while attenuating low frequency components of the signal-resulting in a first filtered video signal stream 514. The first filtered video signal stream 514 is provided to the magnitude detector 504. The magnitude detector can have tunable attack and decay integration rates, allowing it to be used as an asymmetric integrator. By setting the attack rate faster than the decay rate, the average level of the output shifts in proportion to the amplitude of the input signal, thereby providing a measure of the signal's magnitude. Due to its tunability, this circuit can be biased to extract any fraction of the input envelope (such as the full envelope or 1/sqrt(2) for RMS detection) and with any amount of ripple.

The magnitude detector 504 may track either the amplitude or the RMS of a signal. It is used here to track the amplitude and determine the peaks of the magnitude of the first filtered video signal stream 514. The magnitude detector 504 can be a positive peak detector circuit if the attack rate parameter is greater than the decay rate parameter or a negative peak detector circuit if the decay rate parameter is greater than the attack rate parameter. In some examples, the peak detector can be implemented using an asymmetric integrator.

Figure 7A:
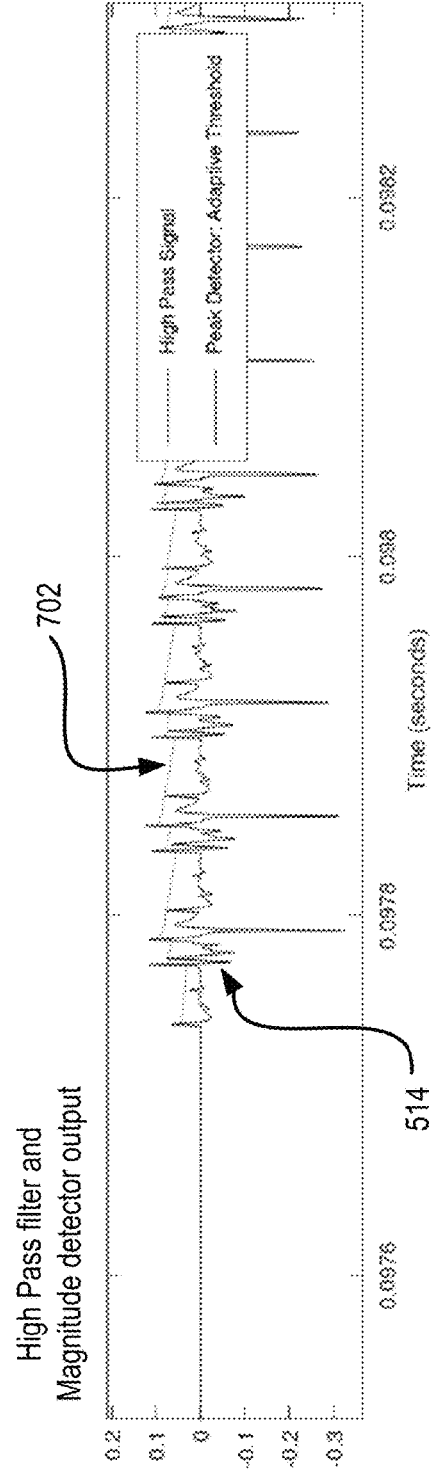
FIGS. 7A-7C shows example waveform representations at various locations in the first feature extraction circuit shown in FIG. 5.

FIG. 7A shows example waveform outputs of the high-pass filter 502 and the magnitude detector 504. In particular, FIG. 7A shows the first filtered video signal stream 514 and the output 702 of the peak detector 504.

Referring again to FIG. 5, the output of the magnitude detector 504 is subtracted from the first filtered video signal stream 514 at the summer 506. The summer 506 can be implemented using an analog summer circuit such as, for example a summer circuit based on differential amplifiers, or by summing currents corresponding to the summer inputs. The output of the magnitude detector 504 is subtracted from the first filtered video signal stream 514 to extract the edges in the first filtered video signal stream 514. The output of the summer 506 is provided to one terminal of the comparator 508, the other input of which is coupled with a voltage source Vth. In some instances, Vth can be represented by a constant current source or can be a programmable offset in the comparator 508. The comparator 508 compares the output signal of the summer 506 with the voltage Vth, which can be adjusted to a voltage level that results in the desired level of edge information to be included in the first feature video signal stream 510. The lower the voltage Vth, the more the amount of edge information in the output of the summer 506 will appear in the first feature video signal stream 510.

Figure 7B:
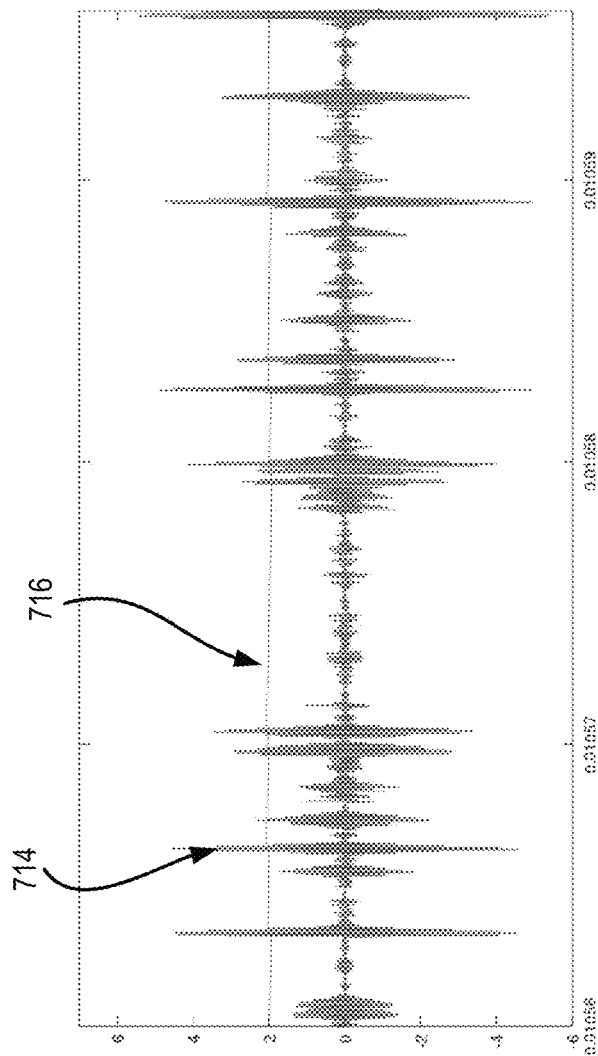
Figure 7C:
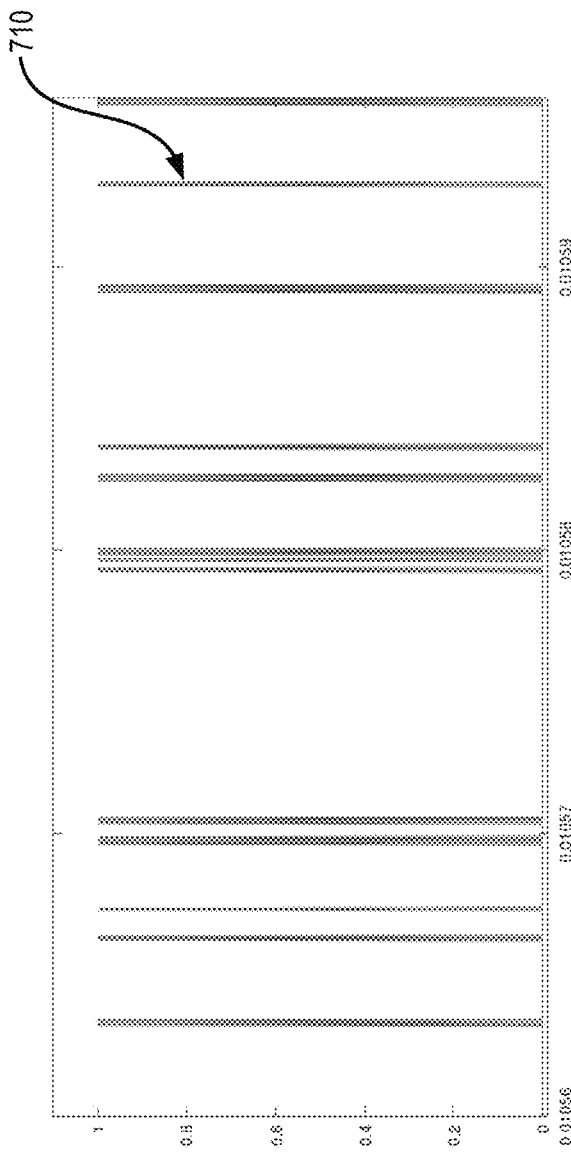

FIGS. 7B and 7C show example waveform outputs of the high-pass filter 502, the magnitude detector 504, and the comparator 508. In particular, FIG. 7B shows an example first filtered video signal stream 714 (at the output of the high-pass filter 502) and an example signal 716 that is the output of the magnitude detector 504; and FIG. 7C shows an example first feature video signal stream 710 (at the output of the comparator 508). The first filtered video signal stream 714, similar to the first filtered video signal stream 514 shown in FIG. 6, includes high frequency components of the video signal stream 512. The magnitude detector 504 generates the example signal 716 based on the peaks detected in the first filtered video signal stream 714. The example, signal 716 can be subtracted from the first filtered video signal stream 714 by the summer 506, the output of which is provided to the comparator 508. FIG. 7C shows an example output of the comparator 508. The first feature video signal stream 710 can swing between a high voltage (e.g., 1 V) and a low voltage (0 V), but the voltages can be different from the ones shown in FIG. 7C and can depend on the particular implementation. The first feature video signal stream 710 represents the features identified in the video signal stream 512. In particular, the first feature video signal stream 710 represents the edge information identified in the video signal stream 512.

Figure 8:
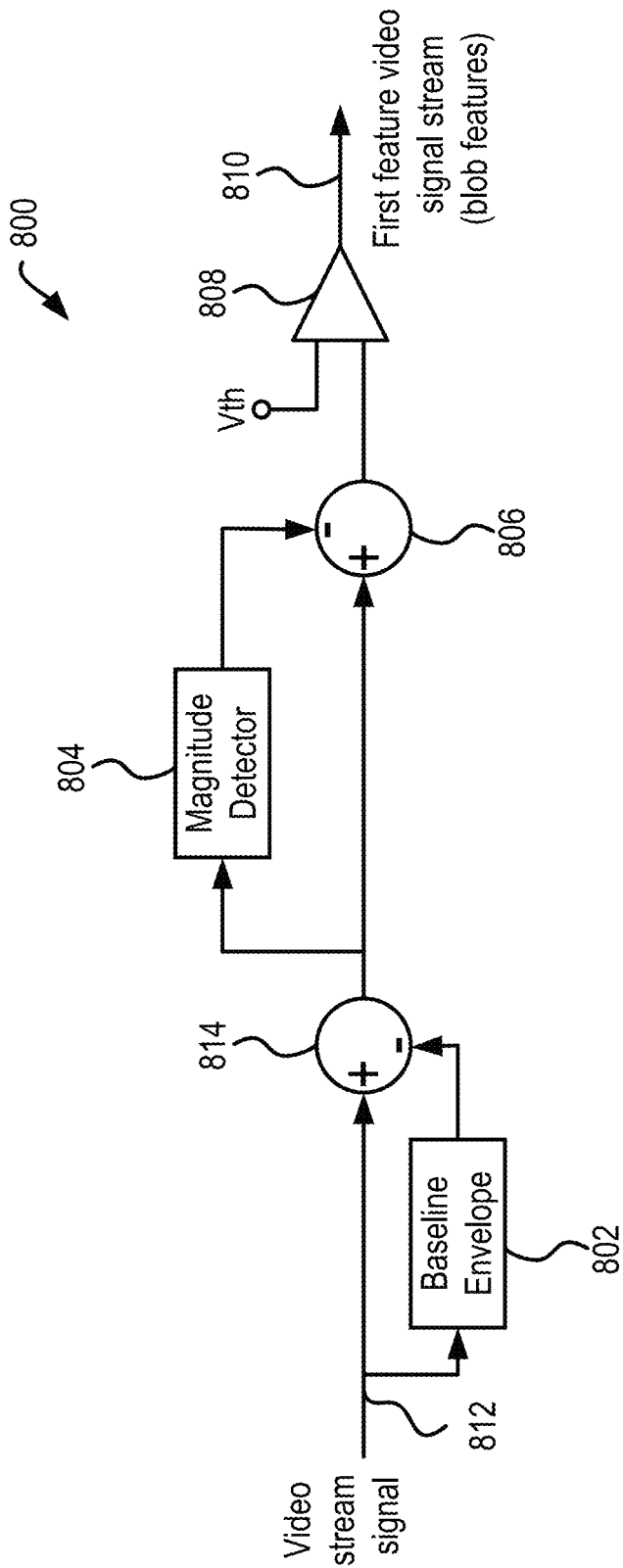
FIG. 8 shows an example second feature extraction circuit for generating a feature video signal.

FIG. 8 shows an example second feature extraction circuit 800 for generating a feature video signal. The second feature extraction circuit 800 can be utilized to generate a second feature video signal corresponding to blob features. Blob features refer to features in the video signal stream 200 that correspond to large objects in the image frame such as, for example, features that are bright in front of a dark background. Blobs are objects which may be surrounded by the edges detected during processing. The second feature extraction circuit 800 includes a baseline envelope generator 802, which is provided with the video signal stream 812 (similar to the video signal stream 512 discussed above in relation to FIG. 5). The baseline envelope generator 802 can generate a signal that corresponds to an envelope of the video signal stream 812. In other words, the baseline envelope generator 802 can generate the signal corresponding to the lower envelope of the video signal stream 812 at any instant of time. The output of the baseline envelope generator 802 can be subtracted from the video signal stream 812 by a first summer 814. Subtracting the output of the baseline envelope generator 802 from the video signal stream 812 can help flatten the features in the video signal stream 812.

The output of the first summer 814 can be provided to a magnitude detector 804, which can function in a manner similar to that discussed above in relation to the magnitude detector 504 shown in FIG. 5. The magnitude detector 804 can be a positive peak detector or a negative peak detector. The output of the magnitude detector 804 can be subtracted from the output of the first summer 814 by a second summer 806. The output of the second summer 806 can be provided to one input of a comparator 808, the other input of which is coupled with a voltage Vth. The output of the comparator 808 can be a second feature video signal stream 810. In some examples, the second feature extraction circuit 800 can include a low-pass filter in place of the magnitude detector 804 to detect the low frequency components of the video signal stream 812.

Figure 9A:
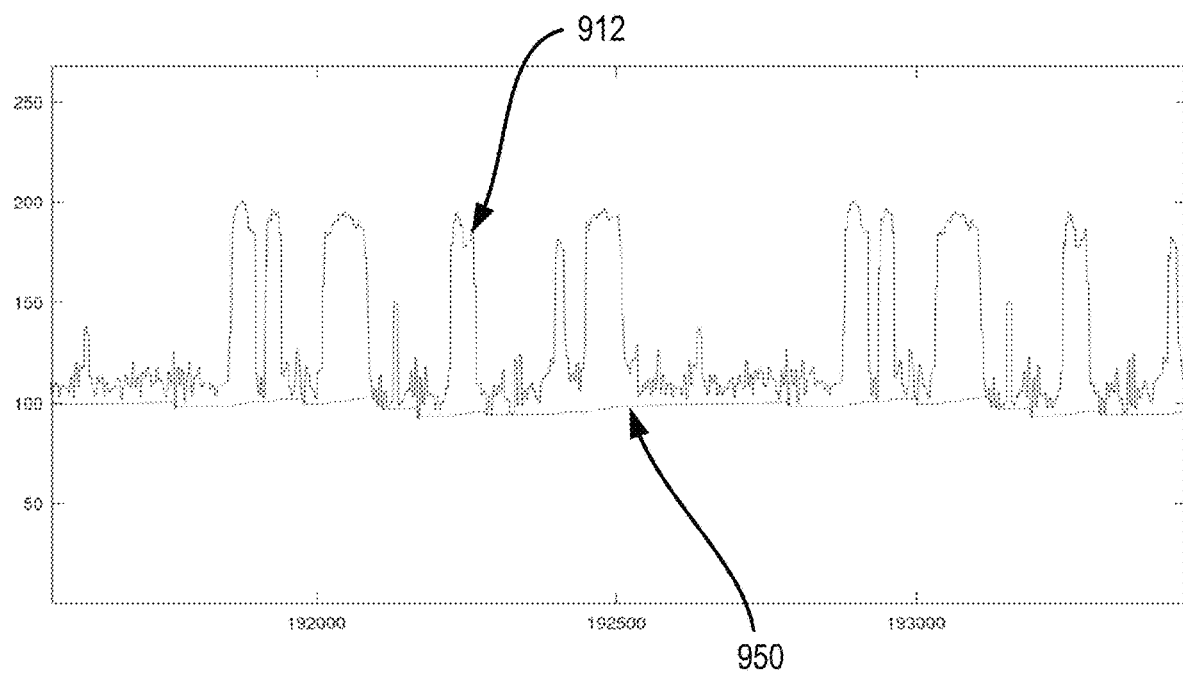
FIGS. 9A-9D shows example waveform representations of signals at various locations in the second feature extraction circuit shown in FIG. 8.
Figure 9B:
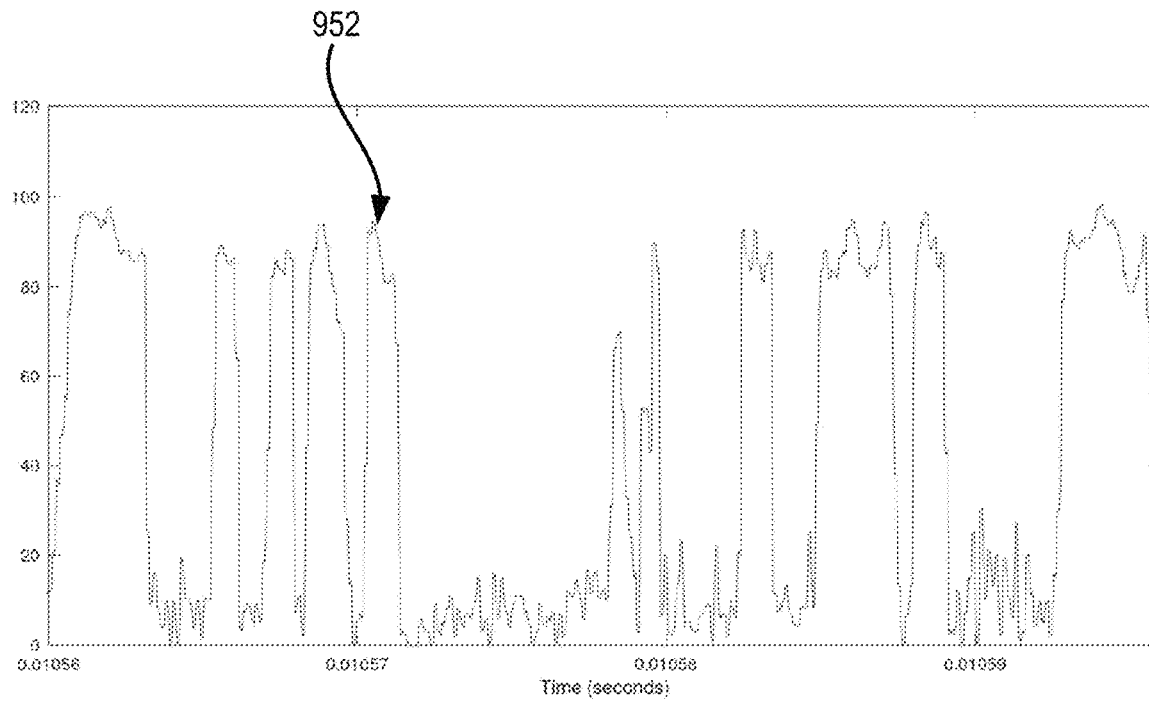
Figure 9C:
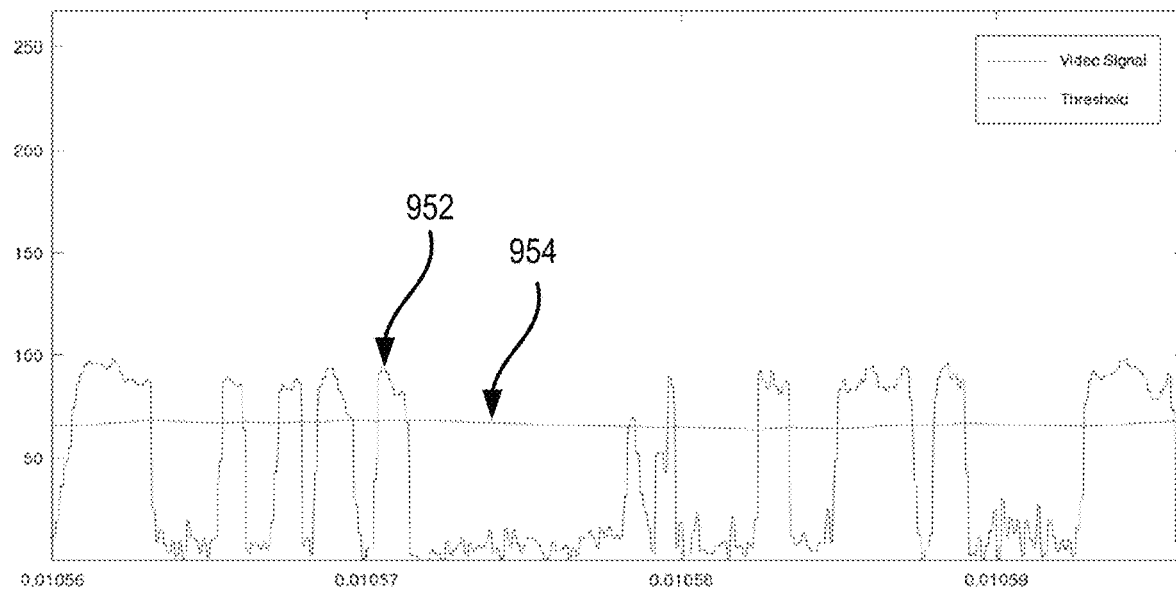
Figure 9D:
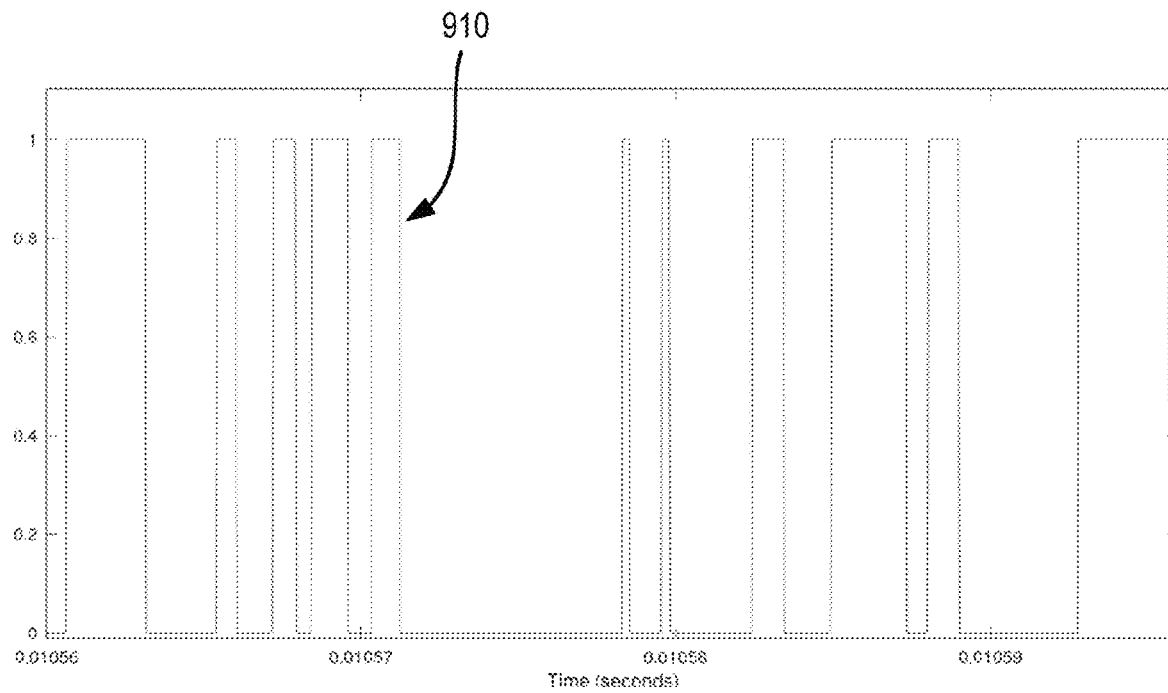

FIGS. 9A-9D shows example waveform representations of signals at various locations in the second feature extraction circuit 800 shown in FIG. 8. For example, FIG. 9A shows an example video signal stream 912 along with an example baseline signal 950 at the output of the baseline envelope generator 802. The baseline envelope generator 802, as mentioned above, can generate a signal that corresponds to the envelope of the video signal stream. In the example shown in FIG. 9A, the baseline signal 950 corresponds to a lower envelope of the video signal stream 912. That is, the baseline signal 950 tracks the low amplitude peaks of the video signal stream 912. An attack rate and a decay rate of the baseline envelope generator 802 can be set to achieve the desired baseline signal 950. An increase in the attack rate can improve the peak tracking ability of the baseline envelope generator 802 while the decay rate can adjust how quickly the baseline signal 950 decays after tracking a peak in the video signal stream 912. FIG. 9B shows an example subtracted video signal stream 952 at the output of the first summer 814 shown in FIG. 8. In particular, the subtracted video stream 952 corresponds to the subtraction of the baseline signal 950 from the video signal stream 912. The subtracted video signal stream 952 is provided to the inputs of the magnitude detector 804 and the second summer 806. FIG. 9C shows an example output signal 954 of the magnitude detector 804 and the subtracted video signal stream 952 at the output of the first summer 814, both of which are provided to the second summer 806. The output of the second summer 806 is provided to one input of the comparator 808. FIG. 9D shows an example second feature video signal stream 910 at the output of the comparator 808. The second feature video signal stream 910 swings between a high voltage and a low voltage. In particular, when the output signal stream of the second summer 806 is greater than the threshold voltage Vth, the second feature video signal stream 910 is at a high voltage value, while when the output of the second summer 806 is less than or equal to the Vth, then the second feature video signal stream 910 is at a low voltage value.

While FIGS. 5-9D provide two example (edges and blobs) features, it should be noted that other feature video signal streams associated with other features could also be generated. For example, other features can include corners, ridges, etc. The circuitry for extracting features such as corners or ridges, for example, are well known and not discussed herein.

Referring again to FIG. 4, the motion detection process 400 includes generating a plurality of masked video signal streams by multiplying the feature video signal stream with a plurality of mask signal streams (406). The masked signal streams can correspond to a plurality of masked regions in an image frame. By multiplying the feature video signal stream with a masked signal stream, the resulting video stream can represent the features within the mask region corresponding to the masked signal stream.

Figure 10:
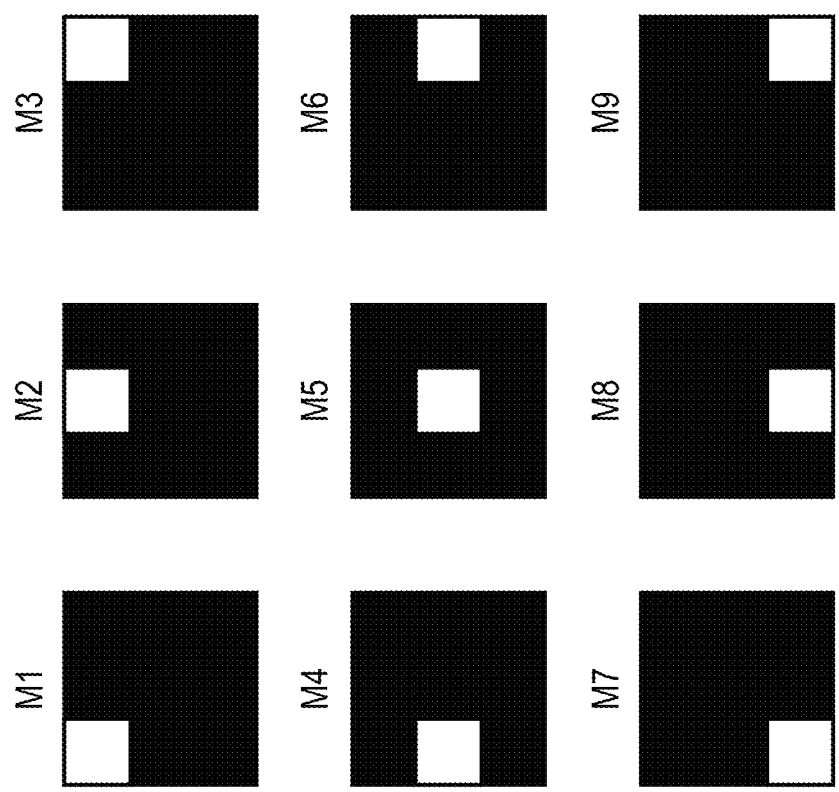
FIG. 10 shows example two-dimensional representations of mask regions.
Figure 11:
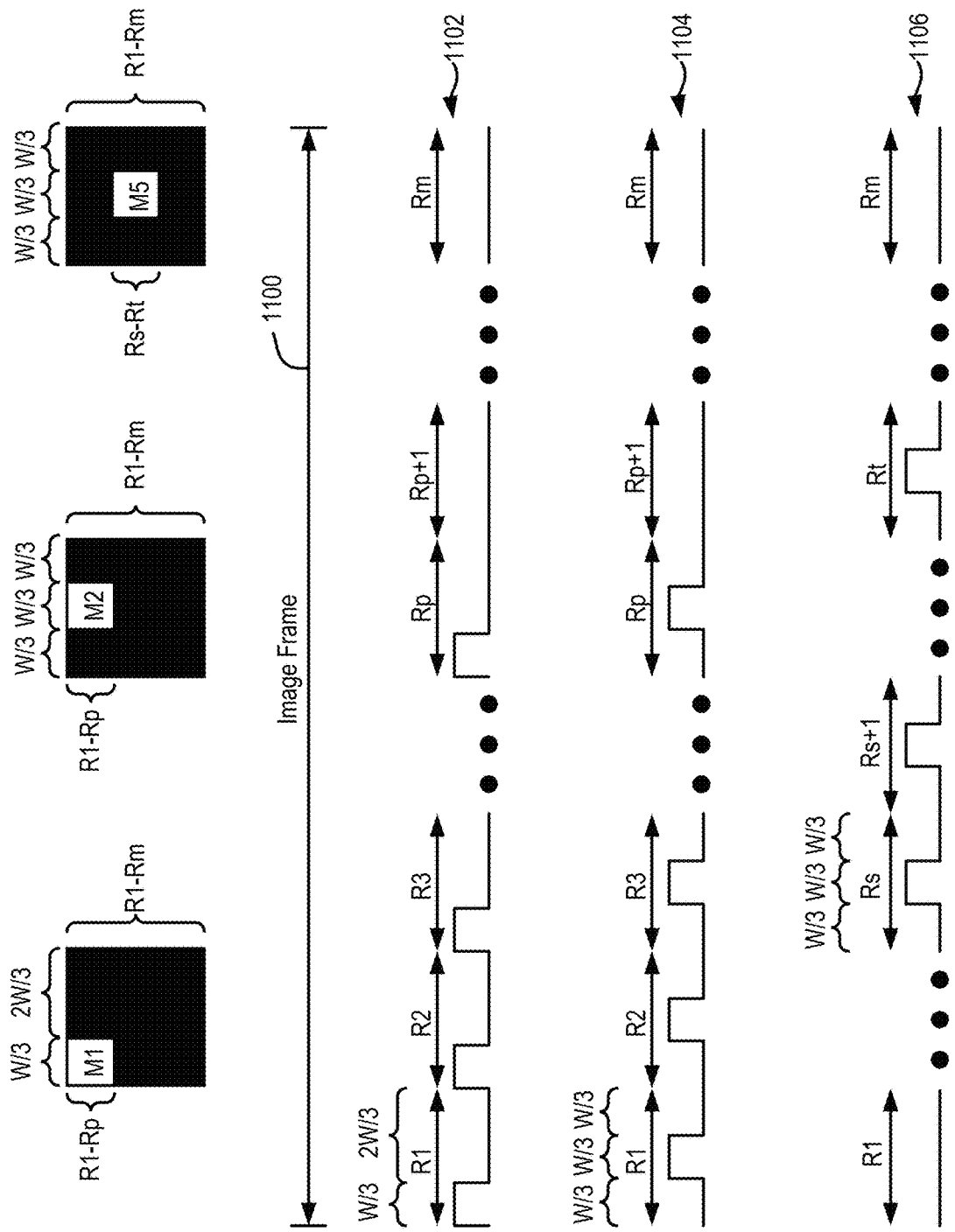
FIG. 11 shows example mask signal streams corresponding to mask regions shown in FIG. 10.

FIG. 10 shows example two-dimensional representations of mask regions. In particular, FIG. 10 shows nine different two-dimensional representations of mask regions. A first mask region M1 is positioned at the top left corner of the image frame, a second mask region M2 is positioned at the top center of the image frame, a third mask region M3 positioned on the top right of the image frame, a fourth mask region M4 positioned at the center left of the image frame, a fifth mask region M5 positioned at the center of the image frame, a sixth mask region M6 positioned at the center right of the image frame, a seventh mask region M7 positioned at the bottom left of the image frame, an eight mask region M8 positioned at the bottom center of the image frame, and a ninth mask region M9 positioned at the bottom right of the image frame. The mask regions indicate the region of the image frame in which the first feature video signal stream 510 and/or the second feature video signal stream 810 is analyzed. The size and shape of each of the mask regions shown in FIG. 11 is only an example, and the number, shape, and size of each of the mask regions can be different. In some examples, the shape of one or more mask regions can be circular, oval shaped, or polygonal (regular or irregular) shaped. In some examples, one or more mask regions can have a size that is different from the other mask regions. In some examples, the mask regions can be non-overlapping, while in some other examples, one or more mask regions can be over-lapping.

Again, the mask regions shown in FIG. 10 are two-dimensional representations of one-dimensional mask signal streams. To that end, FIG. 11 shows example mask signal streams corresponding to a subset of mask regions shown in FIG. 10. In particular, FIG. 11 shows the mask signal streams corresponding to the first mask region M1, the second mask region M2, and the fifth mask region M5. Mask signal streams corresponding to other mask regions can be obtained in the manner similar to that described for the shown mask regions. FIG. 11 shows a first mask signal stream 1102 corresponding to the first mask region M1, a second mask signal stream 1104 corresponding to the second mask region M2, and a fifth mask signal stream 1106 corresponding to the fifth mask region M5. All mask signal streams are shown for a single image frame 1100, however, the mask signal streams can be repeated in subsequent image frames.

When viewed as a function of rows, the first mask region M1 can be formed by having the first mask signal stream 1102 be ON for a certain duration during rows R1-Rp, and be completely OFF for the rows R(p+1) to Rm. For rows R1-Rp, the first mask signal stream 1102 can be ON for a duration that is equivalent to a first third of the width W of the image frame and be OFF for the remainder (⅔×W) of the width of the image frame. Similarly, the second mask region can be formed by having the second mask signal stream 1104 be ON for a certain duration during rows R1-Rp, and be OFF for the rows R(p+1) to Rm. For rows R1-Rp, the second mask signal stream 1104 can be OFF for the first third of the width W of the image frame, be ON for the second third of the width W of the image frame and be OFF for the last third of the width W of the image frame. The fifth mask region can be formed by having the fifth mask signal stream 1106 be ON for a certain duration during rows Rs-Rt, and be OFF for the rows R1-R(s−1) and R(t+1)-Rm. For rows Rs-Rt, the fifth mask signal stream 1106 can be OFF for the first third of the width W of the image frame, be ON for the second third of the width W of the image frame and be OFF for the last third of the width W of the image frame. In a similar manner, the mask signal streams of the remainder of the mask regions can also be obtained. The ON state and the OFF state of the mask signal streams discussed above can correspond to voltage levels. For example, the OFF state can correspond to 0 V, while the ON state can correspond to a non-zero voltage level that can be selected based on the particular implementation.

Figure 12:
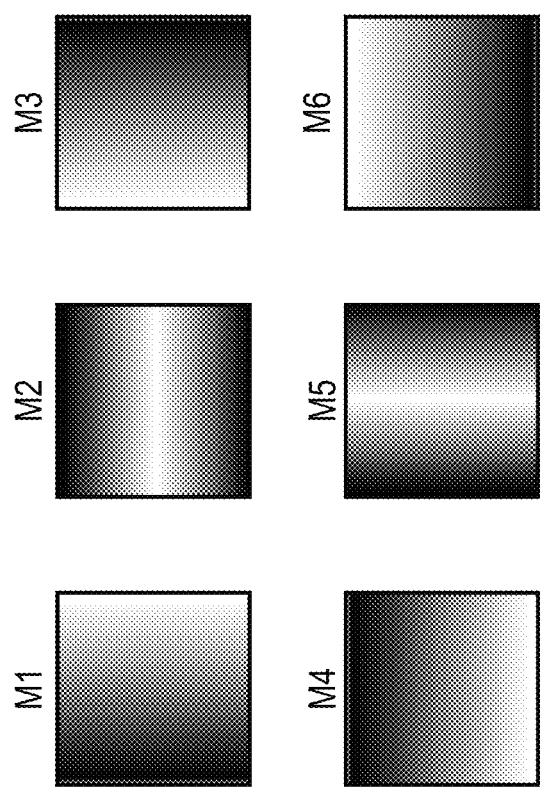
FIG. 12 shows another example two-dimensional representations of mask regions.

As mentioned above, different types of mask regions can be utilized. For example, FIG. 12 shows another example two-dimensional representations of mask regions. Here, the mask regions have gradients in different directions. For example, the mask region M1 has a gradient that goes from left to right of the image frame, the mask region M2 has a gradient that is highest at the top and the bottom of the image frame and lowest at the middle of the image frame, the mask region M3 has a gradient that is highest at the right hand side of the image frame and decreases towards the left hand side of the image frame, the mask region M4 has a gradient is highest at the top of the image frame and decreases towards the bottom of the image frame, the mask region M5 has a gradient that is highest at the left and right of the image frame and lowest at the middle of the image frame, and the mask region M6 has a gradient with the highest at the bottom of the image frame and lowest at the top of the image frame. Mask signal streams in a manner similar to those discussed above in relation to FIGS. 10 and 11 can be generated to represent the mask regions show in FIG. 12. As an example, for the mask region M1, the mask signal stream can include ramp voltage signals for each row R1-Rm, where the signal ramps down from its highest value at the left of the row and to its lowest value at the right of the row. Masks with gradients can be used to detect low frequency patterns in the feature video signal stream. In some examples, the plurality of mask signal streams can correspond to cosines of a plurality of frequencies. In this manner, the plurality of mask signal streams do not necessarily correspond to a mask region in the image frame. In some instances, these mask signal streams can be used to implement a discrete cosine transform (DCT).

Figure 13:
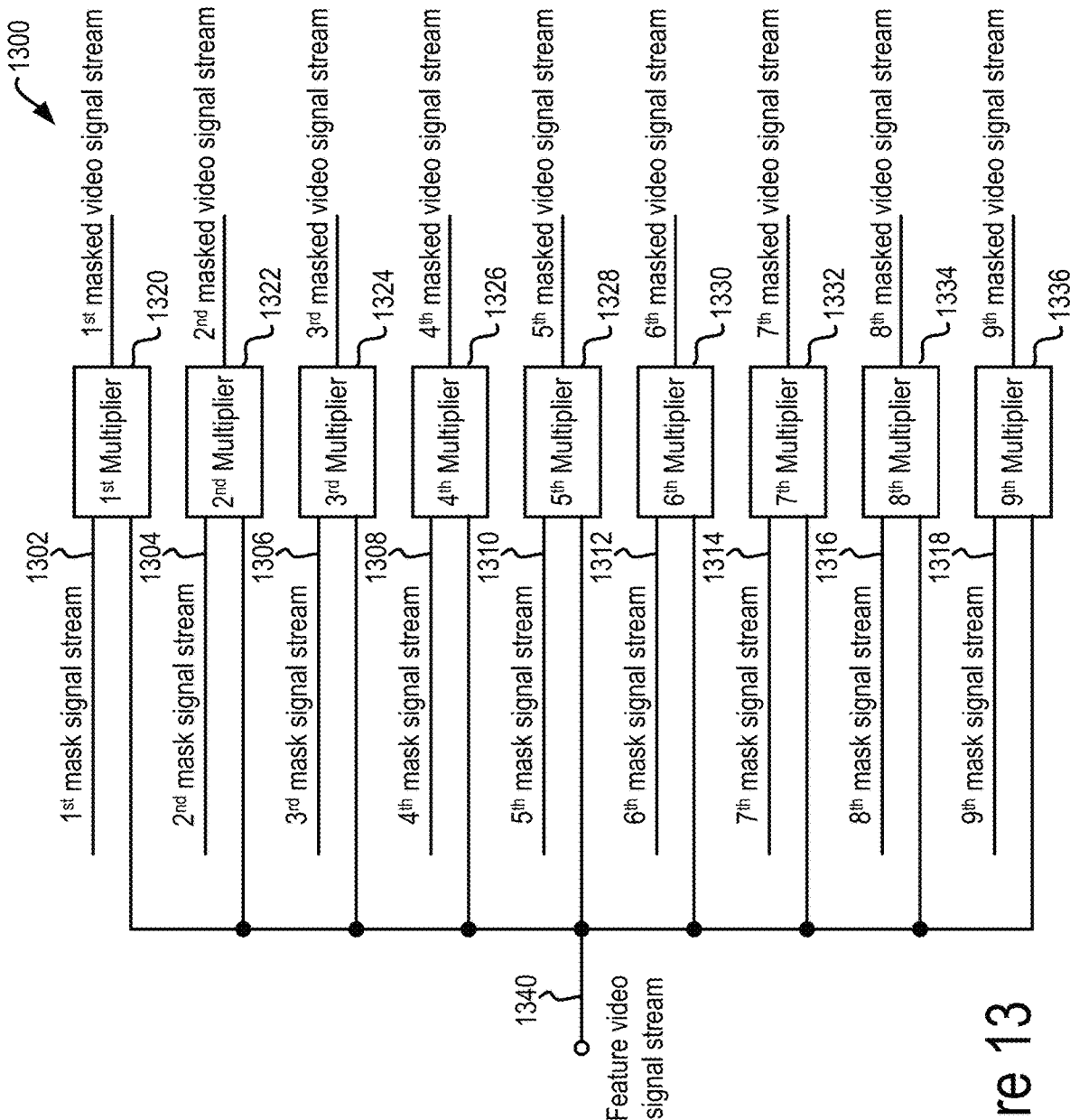
FIG. 13 shows an example masked video signal stream generation circuit for multiplying the feature video signal stream with a plurality of mask signal streams to generate plurality of masked video signal streams.

Referring again to FIG. 4, the motion detection process 400 includes multiplying the feature video signal stream with a plurality of mask signal streams to generate a plurality of masked video signal streams. FIG. 13 shows an example masked video signal stream generation circuit 1300 for multiplying the feature video signal stream with a plurality of mask signal streams to generate a plurality of masked video signal streams. In particular, the masked video signal stream generation circuit 1300 includes nine multipliers: a first multiplier 1320, a second multiplier 1322, a third multiplier 1324, a fourth multiplier 1326, a fifth multiplier 1328, a sixth multiplier 1330, a seventh multiplier 1332, eight multiplier 1334, and a ninth multiplier 1336. Each of the nine multipliers corresponds to a single mask region of the plurality of mask region shown in FIG. 10. The first multiplier 1320 receives the first mask signal stream 1302, the second multiplier 1322 receives the second mask signal stream 1304, the third multiplier 1324 receives the third mask signal stream 1306, the fourth multiplier 1326 receives the fourth mask signal stream 1308, the fifth multiplier 1328 receives the fifth mask signal stream 1310, the sixth multiplier 1330 receives the sixth mask signal stream 1312, the seventh multiplier 1332 receives the seventh mask signal stream 1314, the eighth multiplier 1334 receives the eighth mask signal stream 1316, and the ninth multiplier 1336 receives the ninth mask signal stream 1318. Each of the nine multipliers receives as input the feature video signal stream 1340. The feature video signal stream 1340 can be an output of the feature extraction circuit, such as the first feature extraction circuit 500 (FIG. 5) and the second feature extraction circuit 800 (FIG. 8). The feature video signal stream 1340, which is processed to include the desired feature in the video signal stream, is multiplied by each of the nine mask signal streams. As each of the mask signal stream include ON and OFF regions (see e.g., FIG. 11), when multiplied with the feature video signal stream, the resulting respective masked video signal stream has the signal corresponding to the OFF regions suppressed while the signals corresponding to the ON regions preserved. Thus, further analysis of the masked video signal stream provides information related only to the corresponding mask region. Furthermore, when the mask signal streams are binary ON and OFF regions, each multiplier may be implemented with a gating function that passes the feature video signal stream when the mask signal stream is high and passes zero when the mask signal stream is low. When the feature video signal stream has been thresholded, each multiplier may be implemented with an AND gate that passes a high logic level only when the feature video signal stream exceeds the threshold within the mask regions.

Figure 14:
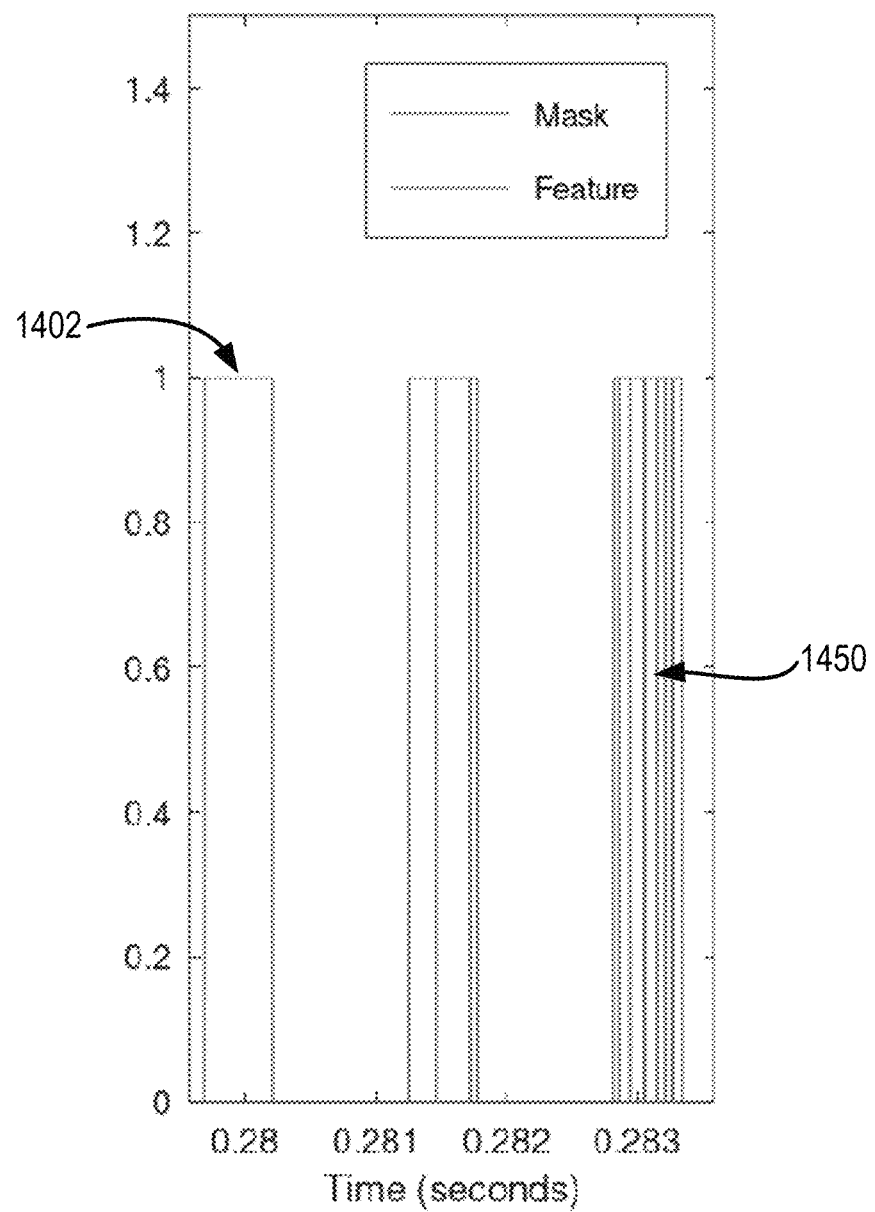
FIG. 14 shows an example masked video signal stream.

FIG. 14 shows an example masked video signal stream. In particular, FIG. 14 shows an example $1^{st}$ masked video signal stream 1450 output by the first multiplier 1320 of the masked video signal stream generation circuit 1300 shown in FIG. 13. FIG. 14 also shows an example first mask signal stream 1402 provided to one of the inputs of the first multiplier 1320. As can be seen in FIG. 14, the first masked video signal stream 1450 has a value equal zero volts when the value of the first mask signal stream 1402 is also zero volts and is equal to the multiple of the instantaneous value of the feature video signal stream 1340 and the high voltage of the first mask signal stream 1302 when the first mask signal stream 1302 has a non-zero high value. In this manner, the masked video signal stream 1450 captures the feature video signal stream 1340 only within the mask region represented by the first mask signal stream 1302. Other masked video signal streams output by other multipliers in the masked video signal stream generation circuit 1300 can be similar to the first masked video signal stream 1450 but capture the feature video signal stream 1340 for their corresponding mask regions.

Referring again to FIG. 4, the motion detection process 400 further includes for each mask video signal, determining a location of an intensity-based parameter of the feature within the image mask for each image frame of the one or more image frames. The center of gravity of the feature can be one example of an intensity-based parameter of the feature within the image mask. The center of gravity provides a helpful measure of the movement of features within a mask region, where the features within the mask region are consolidated to a point within the image frame. This center of gravity can be tracked frame-by-frame to determine whether the features within the mask region have moved.

Figure 15:
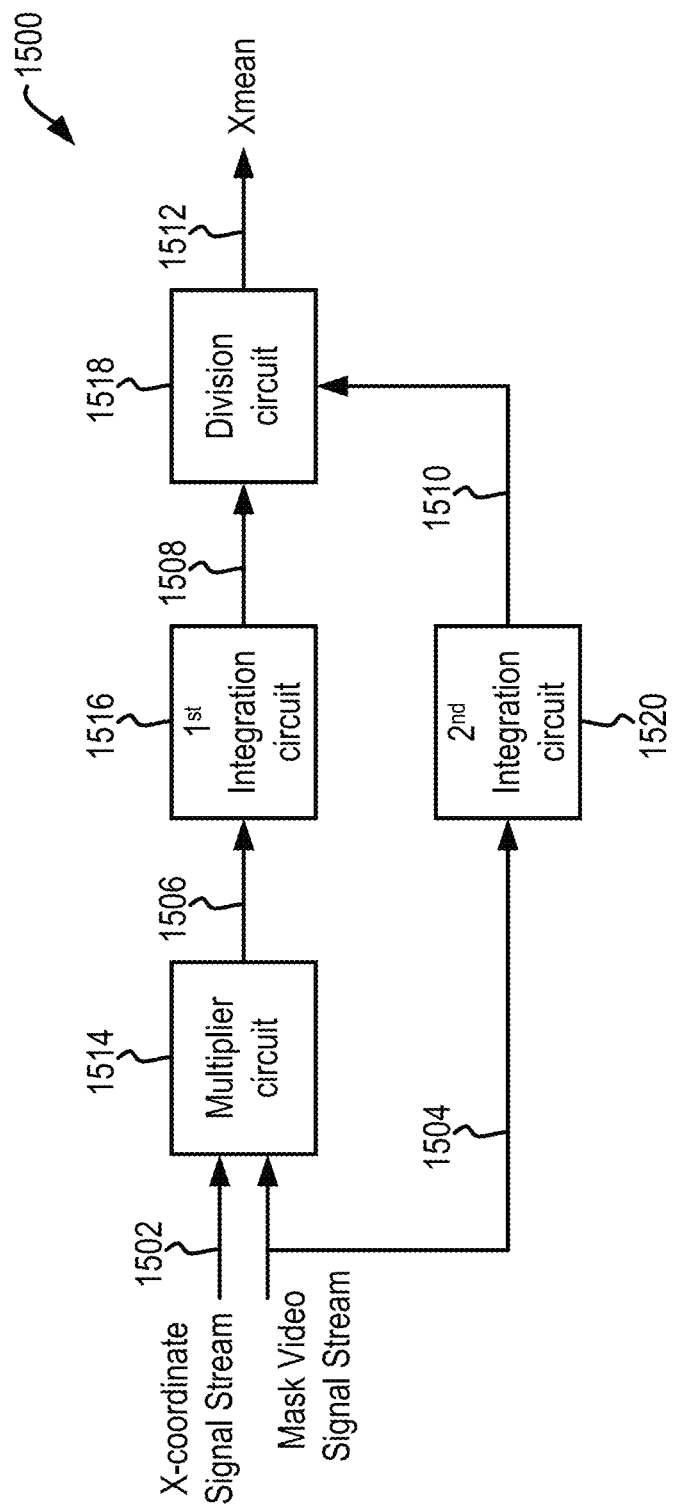
FIG. 15 shows an example x-mean determination circuit.
Figure 16:
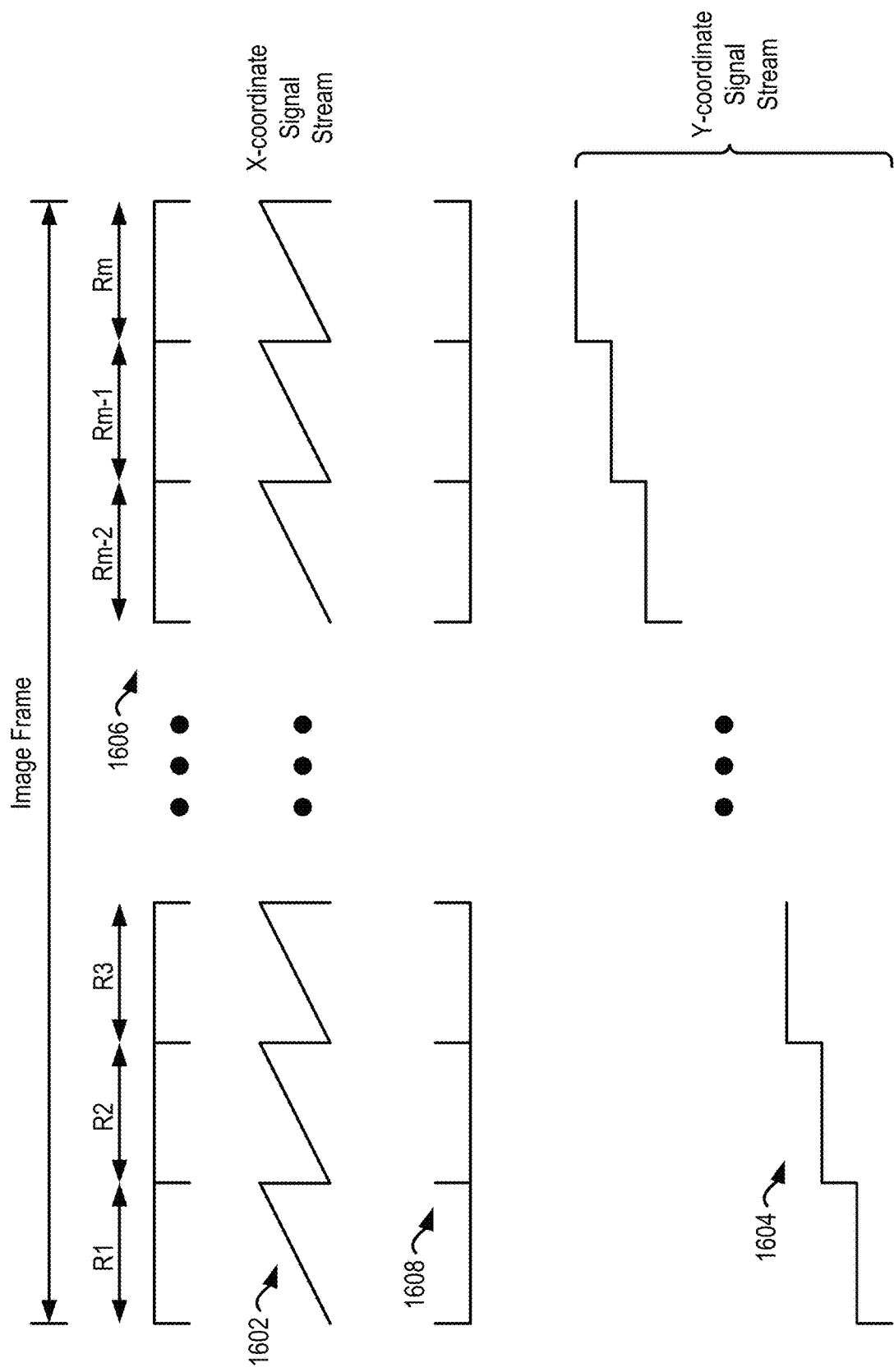
FIG. 16 shows example x-coordinate and y-coordinate signals.

FIG. 15 shows an example x-mean determination circuit 1500. The x-mean determination circuit 1500 can be used to determine the x-mean coordinate of a center of gravity of a feature within each masked video signal stream. That is, for example, nine x-mean determination circuits 1500 can be used to determine nine x-mean coordinates for the nine masked video signal streams shown in FIG. 13. The x-mean determination circuit 1500 includes a multiplier circuit 1514, which receives as inputs a masked video signal stream 1502. FIG. 16 shows example x-coordinate and y-coordinate signals. FIG. 16 shows an image frame 1600 duration that includes several rows R1-Rm. The x-coordinate signal stream 1602 is associated with a location along the width of the image frame. That is, along the width of the rows of the image frame. The y-coordinate signal stream 1604 is associated with a location along the length of the image frame. The x-coordinate signal stream 1602 is a sawtooth signal that includes segments associated with each row, where each segment is a linearly increasing ramp signal. The ramp signal increases in magnitude until the end of the row duration and is reset to a low magnitude at the beginning of the next row duration. In some examples, the x-coordinate signal stream 1602 can be generated by integrating an x-pulse signal stream 1606, for each row duration. The x-pulse signal stream 1606 includes a series of pulses, each of which have a pulse duration that is substantially equal to the duration of each row. In some examples, the x-coordinate signal stream 1602 and the y-coordinate signal stream 1604 can be generated using an integrated signal generator. In some examples, a programmable phase locked loop (PLL) can be used to generate these signals.

Referring again to the x-mean determination circuit 1500 shown in FIG. 15, the multiplier circuit 1514 multiplies the x-coordinate signal stream 1502 (e.g., the x-coordinate signal stream 1602 shown in FIG. 16) with the masked video signal stream 1504 to generate an x-product signal stream 1506. The multiplier circuit 1514 can be implemented using, for example, a voltage multiplier circuit using analog operational amplifiers or analog differential amplifiers. The x-product signal stream 1506 is fed to a first integration circuit 1516 that carries out an integration operation on the x-product signal stream 1506 to generate integrated x-product signal stream 1508. The masked video signal stream 1504 is fed to a second integration circuit 1520 that carries out an integration operation on the masked video signal stream 1504 to generate an integrated masked video signal stream 1510. The first integration circuit 1516 and the second integration circuit 1520 can be implemented using analog operational amplifiers or analog differential amplifiers, for example. The integrated x-product signal stream 1508 and the integrated masked video signal stream 1510 are provided to a division circuit 1518 which divides the integrated x-product signal stream 1508 by the integrated masked video signal stream 1510 to generate the x-mean stream 1512. The x-mean stream 1512 provides the mean x-coordinate of the center of gravity of the feature in the associated mask region. For example, if the masked video signal stream 1504 were the first masked video signal stream associated with the first mask region M1, then the x-mean stream 1512 provides the mean x-coordinate of the center of gravity of the feature (e.g., edge, blob, etc.) in the first mask region M1. In some examples, the second integration circuit 1520 and the division circuit 1518 may not be needed in determining the x-mean stream 1512.

Figure 17:
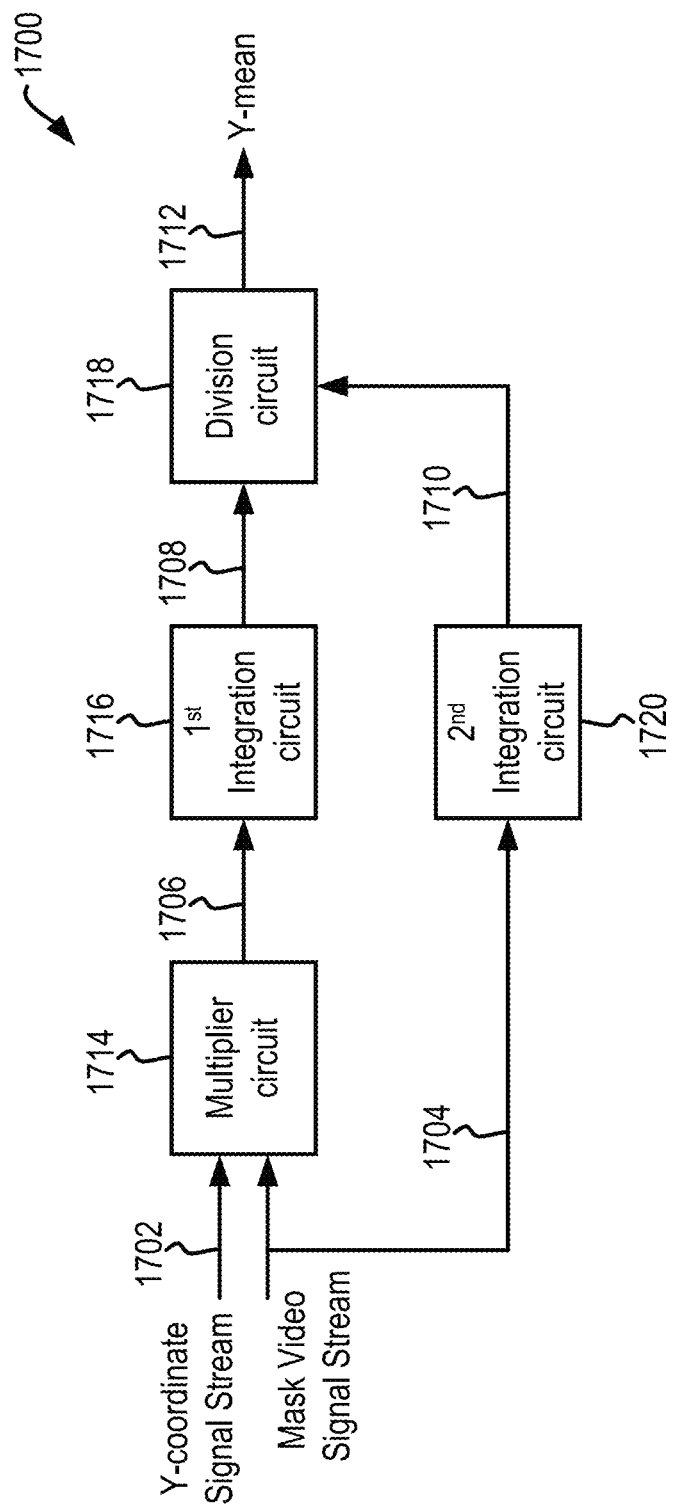
FIG. 17 shows an example y-mean determination circuit.

FIG. 17 shows an example y-mean determination circuit 1700. The y-mean determination circuit 1700 can be used to determine the y-mean coordinate of a center of gravity of a feature within each masked video signal stream. Thus, nine y-mean determination circuits 1700 can be used to determine nine y-mean coordinates for the nine mask video signals streams shown in FIG. 13. The y-mean determination circuit 1700 is similar to the x-mean determination circuit 1500 discussed in relation to FIG. 15, and includes a multiplier circuit 1714, a first integration circuit 1716, a second integration circuit 1720 and a division circuit 1718. The multiplier circuit 1714 multiplies a y-coordinate signal stream 1702 with a masked video signal stream 1704 to generate a y-product signal stream 1706. Referring again to FIG. 16, an example y-coordinate signal stream 1604 is shown. The y-coordinate signal stream 1604 can be generated by carrying out an integration operation on the y-pulse signal stream 1608. The y-pulse signal stream 1608 includes a series of pulses, each of which can be an impulse function or a pulse of very small duration. The pulse duration will need to be less than the time interval of a row. For example, for a frame rate of 30 Hz with an image comprised of 480 rows the pulse width will be less than 69 microseconds so successive pulses don't interfere. Integration of each pulse of the y-pulse signal stream 1608 results in a step function, which stepwise increases in magnitude with each row, indicating the movement of the y-position along the length of the image frame.

Referring again to FIG. 17, the first integration circuit 1716 carries out an integration operation on the y-product signal stream 1706 to generate an integrated y-product signal stream 1708, while the second integration circuit 1720 carries out an integration operation on the masked video signal stream 1704 to generate the integrated masked video signal stream 1710. Finally, the division circuit 1718 generates the y-mean stream based on dividing the integrated y-product signal stream 1708 by the integrated masked video signal stream 1710. The y-mean stream 1712 provides the mean y-coordinate of the center of gravity of the feature in the associated mask region. For example, if the masked video signal stream 1504 were the first masked video signal stream associated with the first mask region M1, then the y-mean stream 1712 provides the mean y-coordinate of the center of gravity of the feature (e.g., edge, blob, etc.) in the first mask region M1. In some examples, the division circuit 1518 and the division circuit 1718 shown in FIGS. 15 and 17, respectively, can be instead replaced with log (logarithm operation) and subtraction circuits. For example, determining logs of the integrated x-product signal stream 1508 and the integrated masked video signal stream 1510 and subtracting the logs is equivalent to dividing the integrated x-product signal stream 1508 by the integrated masked video signal stream 1510. In some instances, log and subtraction circuits can be more readily implemented, and could be used in lieu of the division circuits. In some examples, the 2nd integration circuit 1720 and the division circuit 1518 may be omitted and achieve similar functionality, only without normalization.

Referring again to FIG. 3A, the analog-to-digital converter 306 can sample the x-mean stream 1512 and the y-mean stream 1712 associated with each mask region (e.g., M1-M9) once every image frame, and in some examples at the end of every image frame duration.

Figure 18:
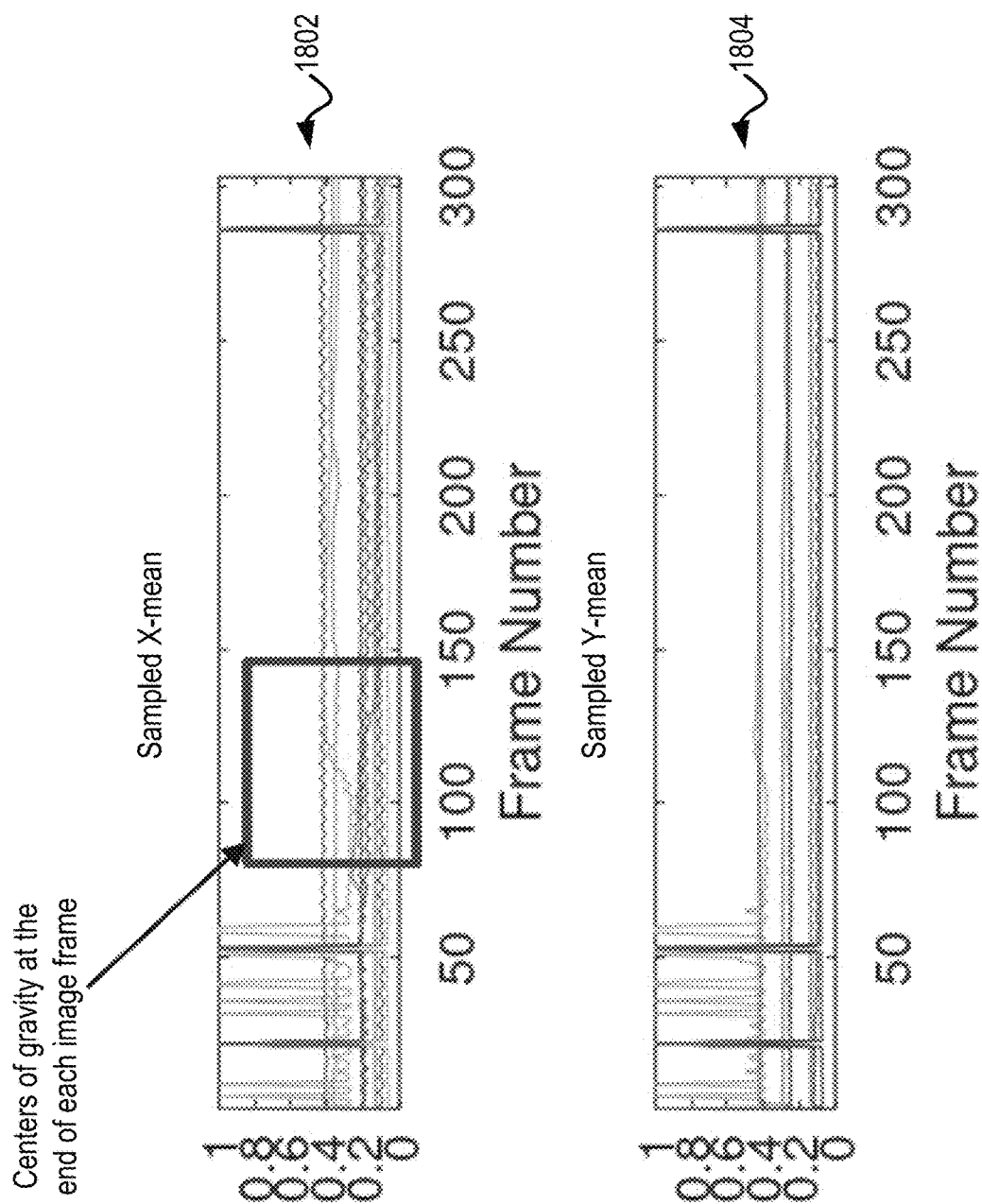
FIG. 18 shows example values of x-mean and y-mean values for each of the masked video signal streams.

FIG. 18 shows example values of x-mean and y-mean values for each of the masked video signal streams. In particular, a first graph 1802 shows the sampled values of various x-means associated with the mask regions over several image frames, and the second graph 1804 shows the sampled values of various y-mean means associated with the mask regions over several image frames. The changes in the values of any one x-mean or y-mean over several image frames can suggest that there has been motion detected.

Figure 19:
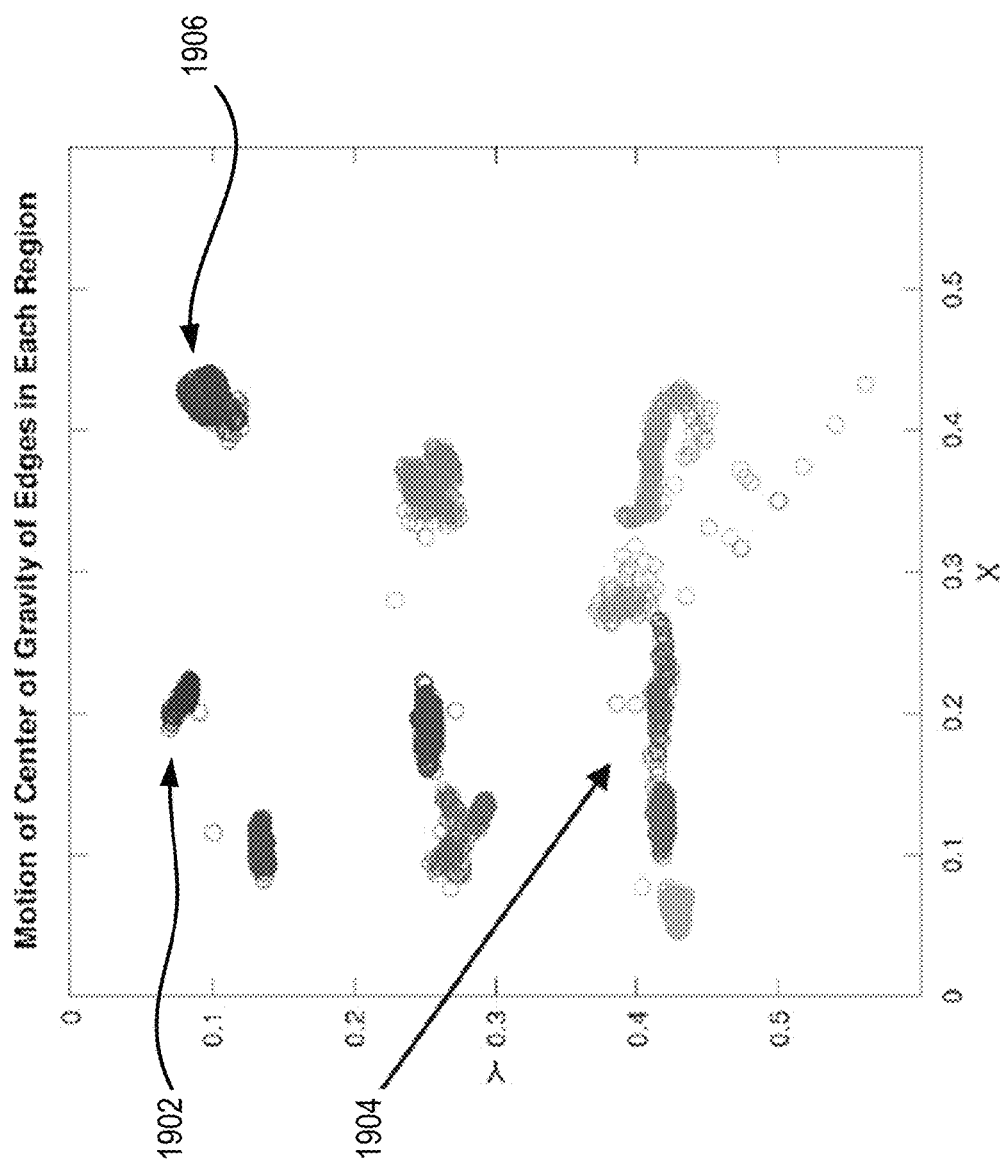
FIG. 19 shows a graph depicting changes in the coordinates of center of gravity of features.

FIG. 19 shows another graph depicting changes in the coordinates of center of gravity of features. In particular, FIG. 19 shows a center of gravity plot 1902 that shows the changes in the center of gravities of features associated with each mask region. The center of gravity plot 1902 can be populated using the sampled x-mean and sampled y-mean values at the end of each image frame. A first set of sampled points 1902 corresponding to one mask region does not show appreciable change in the center of gravity over several image frames. However, a second set of sampled points 1904 and a third set of sampled points 1906 each corresponding to different mask regions show appreciable change in the center of gravity over several image frames.

The digital processor 308 (FIG. 3A), can carry out statistical operations on the sampled x-mean and y-mean values to determine whether motion is detected. As an example, the digital processor 308 can set a threshold value, which when exceeded by the change in either x-mean sampled value or y-mean sampled value, or the Euclidean distance traveled over a predetermined number of image frames can indicate motion detection. In another example, the digital processor 308 can set a range or variance value, which when exceeded by the change in either x-mean sampled value or y-mean sampled value over a predetermined number of image frames can indicate motion detection. Similarly, other statistics can be utilized to detect motion. For example, the digital processor 308 (FIG. 3A), can record a short history of features to characterize the background environment. These features can include the total image intensity within the field of view, the total image intensity within each masked area, the sampled x-mean and y-mean coordinates within the field of view or the sampled x-mean and y-mean coordinates within each masked area to characterize the background environment. The digital processor 308 can use the historical data to set thresholds which when exceeded by one or more of the motion metrics indicate motion detection.

In some instance, upon detection of motion, the digital processor 308 can send a wake-up message to the camera 302 or other devices to power up or to switch out of low-power or standby operation. This can help conserve electrical energy because the devices operate at high-power consuming states only when motion is detected and stay in low-power or standby mode of operation when no motion is detected.

In some examples, several circuits discussed above can be implemented using discrete or integrated circuitry. In some implementations, one or more circuits can be implemented on reconfigurable analog platforms such as field programmable analog arrays (FPAAs).

Referring again to the motion detection process 400 shown in FIG. 4, instead of or in addition to determining the location of the intensity-based parameter of the feature, the motion detection process 400 can include determining in integrated intensity of the intensity-based parameter. The motion detection process 400 can include determining the integrated intensity by integrating each of the mask video signals using, for example, an integration circuit (at least one example of which is discussed above in relation to FIGS. 15 and 17). The output of each integration circuit corresponding to each of the mask video signals of the plurality of mask video signals can correspond to a value of the integrated intensity (the intensity-based parameters) for the mask video signal. Integrating the mask video signal can provide a measure of an overall intensity of the feature video signal stream within the corresponding mask region. A change in the overall intensity within the mask region can in turn provide an indication of motion within that mask region. With respect to features being edges, integrating the mask video signal can integrate the area of the mask region corresponding to the edge features. With respect to features being blobs, integrating the mask video signals can integrate the area of the mask region corresponding to the blob features. A change in the overall intensity of the edge or blob features (or for that matter any other features represented by the feature video signal stream) within the mask regions can provide an indication of motion.

The motion detection process 400 can include monitoring the changes in the value of the integrated intensity over two or more image frames to determine whether there is motion within the image frame. For example, the motion detection circuit 304 can generate voltage or current levels corresponding to each mask video signal, which voltage or current levels can be tracked over two or more image frames by a processor such as for example the digital processor 308. If the change in the voltage or current levels exceed a threshold value, this change can indicate motion within the corresponding mask region. In some other examples, the statistical methods discussed above in relation to the location of the center-of-gravity (or other intensity-based-parameters) can be applied in a similar manner to the voltage or current levels corresponding to the integrated intensity to determine motion within the image frame.

Referring again to FIGS. 10-12, the various mask regions M1-M9 can be dynamically changed over time. In some examples, at least one of the number of mask regions, the positions of the mask regions, and the sizes of the mask regions can be dynamically changed. With regard to the number of mask regions, the number can be changed from one mask to 10s of masks. As the frame size remains constant, the increase in the number of mask regions can correspond to decrease in the sizes of the mask regions, assuming that all the mask regions, as shown in FIG. 9, have the same size. In some examples, increasing the number of mask regions can help improve the detection of motion, as motion of smaller features, which otherwise would not have made an appreciable difference in intensity in a single larger mask region, could be more effectively detected with smaller but larger number of masks. In some examples, the positions of the mask regions can be changed dynamically. For example, the mask regions, which in FIG. 9 are distributed evenly across the image frame and cover the entire area of the image frame, can instead be distributed unevenly across the image frame such as, for example, clustered around any other point in the image frame. The unevenly distributed mask regions can have different sizes and shapes. In some examples, the sizes of one or more mask regions can be changed dynamically. The changes in the number, size, or position of one or more mask regions can be affected based on changes in one or more factors. One factor can include detection of motion in one mask region. Once motion is detected in one mask region, the number of mask regions can be increased in the area where the motion is detected. In some examples, the digital processor 308 can determine the number, the size, and the positions of the mask regions at any given time, and control signal generators that generate the mask signal streams corresponding to the desired number, size and position of the mask regions.

Figure 20:
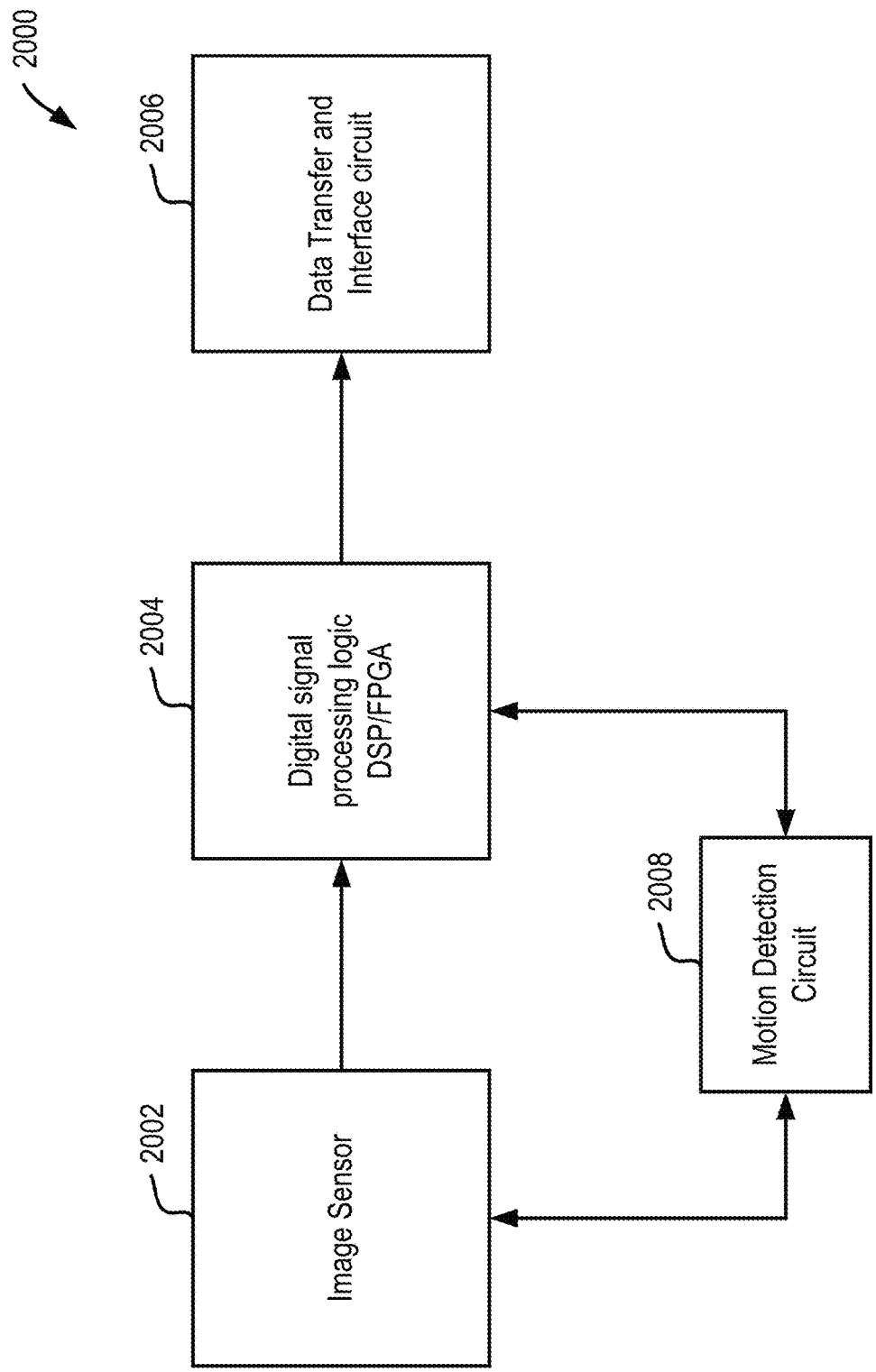
FIG. 20 shows an example block diagram of an imaging device including a motion detection circuit.

FIG. 20 shows an example block diagram of an imaging device 2000 including a motion detection circuit 2008. The imaging device 2000 includes an image sensor 2002, a digital signal processing logic 2004, a data transfer and interface circuit 2006, and a motion detection circuit 2008. It should be noted that the block diagram shown in FIG. 20 is a simplified representation of an imaging device, and several components that would typically be included in an imaging device are not shown for clarity. The motion detection circuit 2008 can be similar to the motion detection circuit 304 discussed above in relation to FIG. 3A, but in some instances can also include the analog-to-digital converter 306 and the digital processor 308 as well. In some examples, the motion detection circuit 2008 and the image sensor 2002 can be fabricated on the same substrate. For example, the motion detection circuit 2008 can be integrated on the same CCD or CMOS chip on which the image sensor 2002 is fabricated. In some examples, the motion detection circuit 2008 can process the image information from the image sensor 2002 prior to the image information being digitized and provided to the digital signal processing logic 2004. The digital signal processing logic 2004 can include digital signal processors (DSPs) and/or field programmable gate arrays (FPGAs) for digital processing of the image information received from the image sensor 2002. Processed image data can be provided by the digital signal processing logic 2004 to the interface circuit 2006, which can transform the image data into one or more desired formats for transmission to devices outside of the imaging device 2000.

The motion detection circuit 2008 can detect motion over two or more image frames based on the image information received from the image sensor 2002 and can provide the motion detection information to the image sensor 2002 or the digital signal processing logic 2004. In one approach to reducing the power consumption of the imaging device 2000, the digital signal processing logic 2004 can be programmed to refrain from processing the image data received from the image sensor 2002 until motion detection indication is received from the motion detection circuit 2008. In another approach, the digital signal processing logic 2004 can be programmed to process the image data received from the image sensor 2002 at a reduced resolution or frame rate (or any other mode that reduces power) until motion detection indication is received from the motion detection circuit 2008. After the motion detection indication is received, the digital signal processing logic 2004 can begin processing the image data in its normal mode of operation. As discussed above, the motion detection circuit 2008, using a one-dimensional representation of the image information, can detect motion at considerably low power. As a result, the motion detection circuit 2008 can remain operational while the remainder of the processing circuitry (e.g., the digital signal processing logic 2004 and the interface circuit 2006) in the imaging device 2000 can remain on standby. If no motion is detected in the image information, the processing circuitry in the imaging device 2000 can be maintained in the standby mode to save power. Once motion is detected, the processing circuitry in the imaging device 2000 can be woken up to come out of standby mode and resume normal operations.

In some examples, the image sensor 2002 can be configured to refrain from outputting imaging information to the digital signal processing logic 2004 until motion is detected by the motion detection circuit 2008. The motion detection circuit 2008 can provide a motion detection indication to the image sensor 2002, which upon receiving the indication, can switch to providing imaging information to the digital signal processing logic 2004. This can reduce power consumption which otherwise would have been consumed in digitizing the pixel data and providing the digitized image frame data to the digital signal processing logic 2004. Once the motion detection indication is received by the image sensor 2002, the image sensor 2002 can begin sending image frame data to the digital signal processing logic 2004.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only and is not intended to be limiting. The skilled artisan will recognize many variants and adaptations of the aspects described herein. These variants and adaptations are intended to be included in the teachings of this disclosure and to be encompassed by the claims herein.

What is claimed is:

1. A system, comprising:
    an imager that generates serialized pixel information as analog voltages based on data from a pixel array; and
    a serialized motion detector that utilizes the serialized pixel information as analog voltages, before the information is digitized by an Analog-to-Digital Converter (ADC), to generate a wakeup signal when motion is detected in the serialized pixel information by:
        receiving the serialized pixel information as a video signal stream that represents a series of rows in one or more image frames;
        filtering the video signal stream with an enhancement filter to generate a feature video signal stream, wherein the feature video stream corresponds to a feature in the video signal stream;
        generating a plurality of masked video signal streams by multiplying the feature video signal stream with a plurality of mask signal streams, wherein each mask signal stream of the plurality of mask signal streams corresponds to an image mask located at a specific location within the one or more image frames;
        for each mask video signal of the plurality of mask video signals, determining a value of an intensity-based parameter of the feature in the video signal stream within the image mask for each image frame of the one or more image frames;
        determining a change in the value of the intensity-based parameter of the feature in the video signal stream over multiple image frames of the one or more image frames; and
        generating the wakeup signal by detecting motion in the video signal streams based on changes in the value of the intensity-based parameter.

2. The system of claim 1, wherein the feature in the video signal stream corresponds to edge information, and wherein the enhancement filter includes a high pass filter.

3. The system of claim 1, wherein the feature in the video signal stream corresponds to a blob, and wherein the enhancement filter includes one of a low pass filter and a band pass filter.

4. The system of claim 1, wherein the system is further to threshold the feature video signal stream by preserving the feature video signal stream above a threshold voltage value before generating the plurality of masked video signal streams.

5. The system of claim 1, wherein each mask signal stream of the plurality of mask signal streams includes a first voltage level for portions of rows that correspond to a location of a respective mask region and a second voltage level for a remainder of portions of rows.

6. The system of claim 5, wherein each mask signal stream of the plurality of mask signal streams is maintained at the first voltage for a first duration for each row of the portion of rows corresponding to a width of the respective mask region.

7. The system of claim 1, wherein a number of the plurality of mask signal streams can be dynamically changed over a plurality of the one or more image frames.

8. The system of claim 1, wherein a position of a mask region corresponding to a mask signal stream of the plurality of mask signal streams can be dynamically changed over a plurality of one or more image frames.

9. The system of claim 1, wherein a size of a mask region corresponding to a mask signal stream of the plurality of mask signal streams can be dynamically changed over a plurality of one or more image frames.

10. The system of claim 1, wherein the value of the intensity-based parameter is a location of the intensity-based parameter.

* * * * *